US009787760B2

(12) United States Patent
Folkening

(10) Patent No.: US 9,787,760 B2
(45) Date of Patent: Oct. 10, 2017

(54) PLATFORM FOR BUILDING VIRTUAL ENTITIES USING EQUITY SYSTEMS

(71) Applicant: Chad Folkening, Delray Beach, FL (US)

(72) Inventor: Chad Folkening, Delray Beach, FL (US)

(*) Notice: Subject to any disclaimer, the term of this patent is extended or adjusted under 35 U.S.C. 154(b) by 374 days.

(21) Appl. No.: 14/495,018

(22) Filed: Sep. 24, 2014

(65) Prior Publication Data

US 2015/0089353 A1 Mar. 26, 2015

Related U.S. Application Data

(60) Provisional application No. 61/881,612, filed on Sep. 24, 2013.

(51) Int. Cl.

| | |
|---|---|
| *G06F 17/00* | (2006.01) |
| *H04L 29/08* | (2006.01) |
| *G06F 9/44* | (2006.01) |
| *G06F 17/30* | (2006.01) |
| *G06Q 10/10* | (2012.01) |
| *G06Q 40/06* | (2012.01) |
| *G06Q 30/02* | (2012.01) |

(52) U.S. Cl.
CPC ............... *H04L 67/10* (2013.01); *G06F 8/38* (2013.01); *G06F 17/3089* (2013.01); *G06F 17/30241* (2013.01); *G06F 17/30867* (2013.01); *G06F 17/30876* (2013.01); *G06F 17/30893* (2013.01); *G06Q 10/10* (2013.01); *G06Q 30/02* (2013.01); *G06Q 40/06* (2013.01)

(58) Field of Classification Search
CPC ............... G06F 17/30893; G06F 17/30; G06F 17/30241; G06F 17/30876; G06F 17/60; G06F 3/0481; G06F 8/38; H04L 67/10; G06Q 10/10
USPC .......................... 715/234, 202, 731-733, 750
See application file for complete search history.

(56) References Cited

U.S. PATENT DOCUMENTS

| | | | | |
|---|---|---|---|---|
| 2001/0027430 A1* | 10/2001 | Sabourian | ............... | G06Q 30/02 705/35 |
| 2009/0233718 A1* | 9/2009 | Shelton | ................... | A63H 18/16 463/42 |

* cited by examiner

*Primary Examiner* — Quoc A Tran
(74) *Attorney, Agent, or Firm* — C. John Brannon; Brannons Sowers & Cracraft PC

(57) ABSTRACT

The present invention involves methods, systems, and apparatus for providing a virtual entity and equity system. In one aspect, a method includes receiving an input website, creating a website portal around the input website for the virtual entity, associating the input website with the client, observing input website activity and deriving valuation data, storing the valuation data, and computing valuation of the virtual entity from the valuation data to provide a calculated expected sale value. Other aspects include receiving external valuation data, game-like interaction with the website portal, and display of the calculated expected sale value to the client. In another aspect, a method includes steps to optimally convert a virtual entity to a legal entity; other aspects including providing conversion documents, receiving external valuation data, and providing game-like interaction with the website portal.

16 Claims, 14 Drawing Sheets

Dashboard / Marketplace / Site A Brand / Submit Application

Team Application for Site A.com

Once application is approved, you will be automatically a brand team member and can contribute in Site A.com Join as:
[ Content Manager ▼ ] ← 405

[ I can help work to my advantage and will try my best to get the job done. ] ← 410

Video URL:
[                    ] ← 415

Resume Upload: ← 420
[ Choose File ] No file chosen

OR

Resume URL: ← 425
[ http://www.linkedin.com/user ]

[ Submit Application ] ← 430

Eservice Requests

| | My eServices Applications | My Approved eServices | Withdraw |
|---|---|---|---|

You will see all your applications to any eService Requests you have applied to

Show [10 ▼] entries                                    Search: [            ]

| Task Title | Date Applied | ◆ Status | Actions |
|---|---|---|---|
| Site A.com — Signup to a Specific Social Site for ___.com | 2013-12-27 03:13:32 | Waiting for Approval | [Cancel] |
| Site B.com — Signup to a Specific Social Site for ___.com | 2014-01-26 20:57:58 | Waiting for Approval | [Cancel] |
| Site A.com — Signup to a Specific Social Site for ___.com | 2013-12-27 03:13:16 | Waiting for Approval | [Cancel] |
| Site C.com — Signup to a Specific Social Site for ___.com | 2014-02-09 20:50:47 | Waiting for Approval | [Cancel] |
| Site C.com — Signup to a Specific Social Site for ___.com | 2014-02-09 20:51:12 | Waiting for Approval | [Cancel] |
| Site A.com — Signup to a Specific Social Site for ___.com | 2013-12-27 03:11:47 | Waiting for Approval | [Cancel] |
| Site C.com — Signup to a Specific Social Site for ___.com | 2014-02-09 20:51:26 | Waiting for Approval | [Cancel] |
| Site A.com — Signup to a Specific Social Site for ___.com | 2013-12-27 03:11:52 | Waiting for Approval | [Cancel] |
| Site D.com — Signup to a Specific Social Site for ___.com | 2014-02-06 21:43:08 | Waiting for Approval | [Cancel] |
| Site D.com — Signup to a Specific Social Site for ___.com | 2014-02-06 21:42:48 | Waiting for Approval | [Cancel] |

Showing 1 to 10 of 42 entries

Fig. 8

PLATFORM FOR BUILDING VIRTUAL ENTITIES USING EQUITY SYSTEMS

CROSS-REFERENCE TO RELATED APPLICATIONS

This application claims the benefit under 35 U.S.C. §119(e) of U.S. Patent Application No. 61/881,612, entitled "Platform For Building Virtual Businesses Using Equity Systems," filed Sep. 24, 2013, which is incorporated herein by reference in its entirety.

BACKGROUND

This specification relates to the field of software applications. More specifically, the present invention is in the technical field of software formation automation.

Over the past decade, electronic commerce has continued to grow rapidly. Ecommerce suppliers and companies are quickly outpacing the growth of many brick-and-mortar retail stores. Many of these ecommerce entities establish themselves as a simple virtual entity front on the Internet. However, after a point many of these companies decide to convert their virtual entity into a real-world, legal entity such as a corporation or a limited liability company (LLC). However, these ecommerce entities have no way to track the value of their ecommerce entity assets or brand. Alternatively, some ecommerce entities may expend great resources to create a legal entity first before creating their ecommerce entity, only to have the ecommerce entity fail to achieve a viable market position.

Additionally, the rise of top-level domains (TLDs), generic top-level domains (gTLDs), and pseudo-top-level domains (pTLDs) has further expanded ecommerce entity proliferation and system expansion. Initial investors may start building systems in conjunction with a promising domain upon which to build an ecommerce entity, forming the basis of the ecommerce brand. Further, development of these promising domains through traditional website and marketplace creation methods has proven inefficient and insufficient to create viable ecommerce entities.

Moreover, managing the development of multiple related domains is challenging, and existing software is primarily designed to build out and manage one domain at a time. Efficient and effective scaling has also been a challenge when dealing with multiple domains. Combining the concepts of domain management, domain creation, ecommerce entity valuation, and distributed entity development has proved problematic, if not impossible, when attempted by traditional systems.

SUMMARY

This specification describes technologies relating to creation of virtual entities based on domain development in conjunction with providing integration of entity contributors into a larger entity through a virtual entity and equity system.

Embodiments of the present invention include, among other features, functions, and capabilities, systems and methods of automated creation of a virtual entity and conversion of the virtual entity to a legal entity. Further embodiments allow better processes, development, management, and application of multiple uniform resource locator (URL) assets in a single interface. Specifically, some embodiments streamline and distribute site development and management through scalable application replication, distributed/outsourced development, network utilization, and centralized management tools that allow the domain asset to increase is value through better tools, techniques, and workflows. Some embodiments may also provide other improved scaling and value-increasing features.

In general, one innovative aspect of the subject matter described in this specification may be embodied in methods, in one example including the actions of receiving an input website, creating a website portal around the input website for the virtual entity, associating the input website with the client, observing input website activity and deriving valuation data, storing the valuation data, and computing valuation of the virtual entity from the valuation data to provide a calculated expected sale value. Other embodiments of this aspect include receiving external valuation data, game-like interaction with the website portal, display of the calculated expected sale value to the client, and corresponding systems, apparatus, and computer programs, configured to perform the actions of the methods, encoded on computer storage devices.

Particular embodiments of the subject matter described in this specification may be implemented to realize one or more of the following advantages.

In one embodiment, the virtual entity and equity system may enable application development and application replication based around keyword content of the domain (e.g., the URL). For example, survey software may be developed and/or replicated for survey domains—for instance, fashionsurvey.com, studentsurvey.com, etc.

Other embodiments of the same system may be further used to build and operate various individual domains. This allows each website to be its own entity, managed independently but also still part of a larger network of related assets. In some implementations of the system, users of the system may act as contractors and/or freelancers to design as much or as little of the domain(s) as desired.

Additionally, the system may be used to integrate URL assets on one URL/keyword list with other related URL/keyword lists. For example, in the case of the hypothetical "studentsurvey.com," the URL/keyword network—in this case the survey-related network—may also be integrated and interconnected with other relevant URL/keyword networks on the system—such as StudentNews.com, studentDirectory.com, StudentChallenge.com, etc. This integration and interconnection of an asset with other relevant assets creates a collaborative and intertwined ecosystem, increasing efficiency and decreasing repetitive creation of assets.

Another embodiment of the system may allow for the creation and distribution of equity-like trust shares in assets. For example, a manager may earn his or her equity-like trust shares into an asset by creating and contributing all or part of an asset. He or she may also have the option to work with others inside the system's networks to offer his or her asset's function and/or service to network partners. Some embodiments may also use an integrated affiliate and/or referral system.

An additional embodiment of the system may enable theoretical market valuation of a URL asset. This may be accomplished, for example, through expert evaluations, network evaluations, crowdsourcing by trusted and approved entities, or any other valuation method. In some implementations of the system, the theoretical market valuation may also be published. This theoretical valuation data may then be used for allocation of equity-like trust shares and investment determinations, among other things.

Another embodiment of the system allows for project management functions. These project management functions allow real-time updates of the current status and progress of the asset, as well as the progress of documented needs and services of an asset.

Further embodiments of the system may allow autonomous, collaborative building and operation of legal corporations based primarily on URL assets through the use of operating scripts and keyword/functionality related to an asset's service. Such operating scripts can, for example, monitor, optimize, advertise, acquire resources, facilitate expansion of subdomains or subdivisions or the domain, and/or automate the conversion of the trust-based shares of the domain into legal equity shares of a legal entity (e.g., a corporation).

Other embodiments of the system may allow users to interact with the system and/or system users with game-like features. For example users may compete to have the most visitors in a month, develop the highest rated new application for a system website, attract the most publicity on social media, and/or any number of other competitive tasks. Competition in such tasks may improve activity on system websites, increase the user base of the system, attract new ideas/talent to the system, etc. Competitors may receive tangible and/or intangible rewards for their participation, progress, and/or skill in such game-like feature competitions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 depicts a screen shot of an implementation of the virtual entity and equity system's frontend interface displaying a frontend team application form.

FIG. 8 depicts a screen shot of an implementation of the virtual entity and equity system's frontend interface displaying a frontend eservice requests webpage.

Like reference numbers and designations in the various drawings indicate like elements.

DETAILED DESCRIPTION

Figure 1:
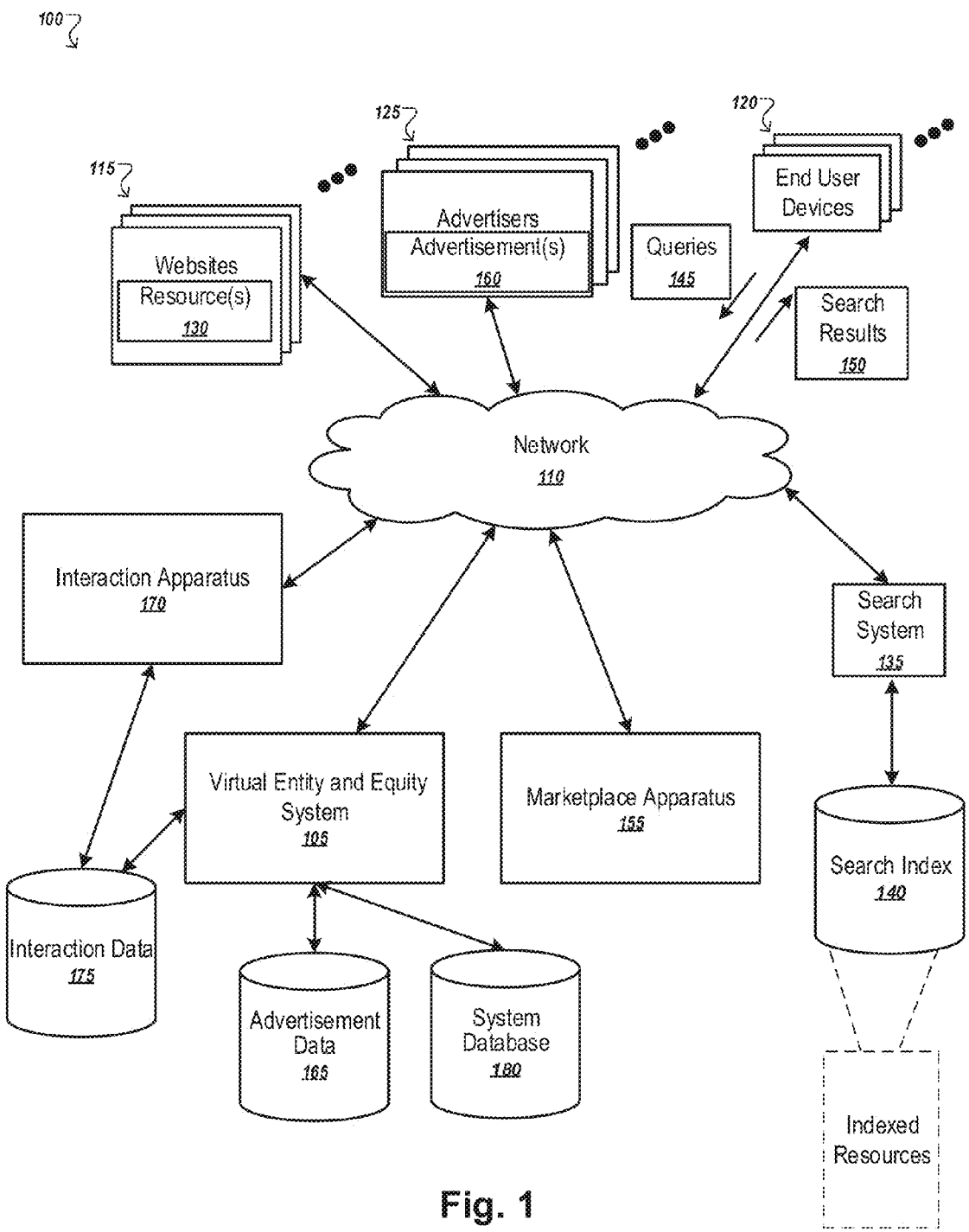
FIG. 1 is a block diagram of an example environment in which the virtual entity and equity system may exist.

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," an and the include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not. Additionally, "generates," "populates," "generating," and "populating" mean that the virtual entity and equity system 105, client, end user (user, system user), and/or module may produce some event or cause some event element to be produced. For example, a webpage may receive data to display in whole or in part to display a valuation estimate to an end user device, the webpage may pull such data from a source other than the virtual entity and equity system 105 (e.g., other servers, intermediaries, etc.), or the virtual entity and equity system 105 may entirely provide the valuation estimate to be produced on the webpage.

While prior art systems for the creation of ecommerce (and the like) entities are limited to inefficient and insufficiently suited mechanisms as described above in this disclosure, the present system allows for efficient creation of ecommerce entities sufficient to optimally measure, track, evaluate, and convert ecommerce entities to legal entities. Further, the present system is not limited simply to ecommerce entity application. For example, it may be used for a wide variety of other services and features (e.g., surveys, social media, advertising, data collection, crowdfunding, gaming, etc.). For example, the system 105 may be used to gather a wide range of users to develop a single concept for a new game and then develop that game; to design a new advertising campaign for a presidential campaign; to build a distributed database of users' literature and/or research; to promote new musical and/or graphical artists; to develop a novel consumer product; etc. In such a capacity, system 105 may monitor additional data and activity beyond that involved in ecommerce, for example by evaluating interactions and activity on a web site related to a particular objective, including but not limited to, evaluating social media interactions for favorability or unfavorability to a campaign (advertising or political), compiling files and links relating to a new promotion, and/or conducting surveys to determine effectiveness of a new website presentation. The present system thus may facilitate a platform that may enable the creation and management of many other distinct and/or interconnected platforms (i.e., a multi-platform).

FIG. 1 is a block diagram of an example environment 100 in which virtual entity and equity system 105 may exist. For example, the environment 100 includes a virtual entity and equity system 105 that facilitates collaboratively building online entities and converting equity-like trust shares (equity points) into a legal equity system. The example environment 100 also includes a network 110, such as a local area network (LAN), a wide area network (WAN), the Internet, or a combination thereof. The network 110 connects websites 115, end user devices 120, advertisers 125, and the virtual entity and equity system 105. The example environment 100 may potentially include many thousands of websites 115, end user devices 120, and advertisers 125.

A website 115 is one or more resources 130 associated with a domain name and hosted by one or more servers. An example website 115 is a collection of webpages formatted in hypertext markup language (HTML) that may contain text, images, multimedia content, and programming elements, such as scripts. Each website 115 is maintained by a publisher, which is an entity that controls, manages, and/or owns the website 115.

A resource 130 is any data that may be provided over the network 110. A resource 130 is identified by a resource address (e.g., a URL) that is associated with the resource 130. Resources 130 include HTML webpages, word processing documents, and portable document format (PDF) documents, images, video, and feed sources, to name only a few. The resources 130 may include content, such as words, phrases, images and sounds, that may include embedded information—such as meta-information in hyperlinks—and/or embedded instructions (such as JavaScript scripts). Units of content—for example, data files, scripts, content files, or other digital data—that are presented in (or with) resources are referred to as content items.

End user devices 120 are electronic devices that are under the control of an end user and are capable of requesting and receiving resources 130 over the network 110. Example end user devices 120 include personal computers, mobile communication devices, and other devices that may send and receive data over the network 110. End user devices 120 typically include a user application, such as a web browser, to facilitate the sending and receiving of data over the network 110.

In some implementations, websites 115 (apps, client services; hereinafter simply "websites" for ease of use), end user devices 120, and the system 105 may directly intercommunicate, excluding the need for the Internet from the scope of a network 110. For example, the websites 115, end user devices 120, and the virtual entity and equity system 105 may directly communicate over device-to-device (D2D) communication protocols (e.g., Wi-Fi Direct, Long Term Evolution (LTE) D2D, LTE Advanced (LTE A), D2D, etc.), wireless wide area networks, and/or satellite links thus eliminate the need for the network 110 entirely. In other implementations, the websites 115, end user devices 120, and the system 105 may communicate indirectly to the exclusion of the Internet from the scope of the network 110 by communicating over wireless wide area networks and/or satellite links. Further, end user devices 120 may similarly send and receive search queries 145 and search results 150 indirectly or directly.

In wireless wide area networks, communication primarily occurs through the transmission of radio signals over analog, digital cellular, or personal communications service (PCS) networks. Signals may also be transmitted through microwaves and other electromagnetic waves. At the present time, most wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), personal digital cellular (PDC), or through packet-data technology over analog systems such as cellular digital packet data (CDPD) used on the Advance Mobile Phone Service (AMPS).

The terms "wireless application protocol" or "WAP" mean a universal specification to facilitate the delivery and presentation of web-based data on handheld and mobile devices with small user interfaces. "Mobile Software" refers to the software operating system that allows for application programs to be implemented on a mobile device such as a mobile telephone or PDA. Examples of Mobile Software are JAVA and JAVA ME (JAVA and JAVA ME are trademarks of Sun Microsystems, Inc. of Santa Clara, Calif.), BREW (BREW is a registered trademark of Qualcomm Incorporated of San Diego, Calif.), WINDOWS Mobile (WINDOWS is a registered trademark of Microsoft Corporation of Redmond, Wash.), PALM OS (PALM is a registered trademark of Palm, Inc. of Sunnyvale, Calif.), SYMBIAN OS (SYMBIAN is a registered trademark of Symbian Software Limited Corporation of London, United Kingdom), ANDROID OS (ANDROID is a registered trademark of Google, Inc. of Mountain View, Calif.), and IPHONE OS (IPHONE is a registered trademark of Apple, Inc. of Cupertino, Calif.), and WINDOWS PHONE 7 (WINDOWS PHONE is a registered trademark the Microsoft Corporation of Redmond, Wash.). "Mobile Apps" refers to software programs written for execution with Mobile Software.

The virtual entity and equity system 105 may use one or more modules to perform various functions including, but not limited to, searching, analyzing, querying, interfacing, etc. A "module" refers to a portion of a computer system and/or software program that carries out one or more specific functions and may be used alone or combined with other modules of the same system or program. For example, a module may be located on the virtual entity and equity system 105 (e.g., on the servers of the system 105, i.e., server-side module), on end user devices 120, or on an intermediary device (e.g., the client server, i.e., a client-side module; another end user device 120; a different server on the network 110; or any other machine capable of direct or indirect communication with the system 105, websites 115, the search system 135, and/or the end user devices 120.)

Typically, modules may be coded in JAVASCRIPT (JAVASCRIPT is a registered trademark of Sun Microsystems, Inc., a Delaware corporation, located at 4150 Network Circle Santa Clara, Calif. 95054), PHP, or HTML, but may be created using any known programming language (e.g., BASIC, FORTRAN, C, C++, C#, PERL (PERL is a registered trademark of Yet Another Society DBA The Perl Foundation, a Michigan nonprofit corporation, located at 340 S. Lemon Ave. #6055, Walnut, Calif. 91789)) and/or package (e.g., compressed file (e.g., zip, gzip, 7zip, RAR (RAR is a registered trademark of Alexander Roshal, an individual, located in the Russian Federation AlgoComp Ltd., Kosareva 52b-83, Chelyabinsk, Russian Federation 454106), etc.), executable, etc.).

In some implementations, the system 105 may be packaged, distributed, scripted, installed by a technician of the system 105, and/or otherwise deployed to a client server location such that the system 105 exists within the client server and/or client server network, either in whole or in part. For example, the system 105 may be scripted and/or packaged into an executable package and downloaded by a client administrator; the client administrator then installing the system 105 software package(s) onto the client server(s). Such setups may allow the system 105 to operate all system 105 operations entirely within the client server(s) and/or client network, excluding the need to interface with the system 105 provider's servers for some or all system 105 functions. Such an implementation may, for example, be used to reduce bandwidth, latency, complexity of network management, etc. In some other implementations, the client servers may facilitate only some of the system 105 functions and interface with the system 105 servers (over a network or directly) to enable those remaining functions. Still other implementations may link to the system 105 servers to obtain updates, patches, and/or other modifications to the system 105 distributions.

The system 105 software distributions may, in some implementations, be installed in a virtual environment (e.g., HYPER-V (HYPER-V is a registered trademark of Microsoft, a Washington Corporation, located at One Microsoft Way, Redmond, Wash. 98052); VIRTUALBOX (VIRTUALBOX is a registered trademark of Oracle America, Inc., a Delaware corporation, located at 500 Oracle Parkway, Redwood Shores, Calif. 94065); VMWARE (VMWARE is a registered trademark of VMWare, Inc., a Delaware corporation, located at 3401 Hillview Ave., Palo Alto, Calif. 94304), etc.).

In other implementations, the system 105 software may be installed in whole or in part on an intermediary system that is separate from the client and the system 105 servers. For example, the system 105 software may be installed by an intermediary worker, a client worker, and/or a system 105 worker onto a hosting service (e.g., AMAZON WEB SERVICES (AWS) (AWS is a registered trademark of Amazon Technologies, Inc., a Nevada corporation, located at PO Box 8102, Reno, Nev. 89507), RACKSPACE (RACKSPACE is a registered trademark of Rackspace US, Inc., a Delaware corporation, located at 1 Fanatical Place, City of Windcrest, San Antonio, Tex. 78218), etc. The client may then connect to the intermediary and/or the system 105 servers to access the system 105 functions. Such implementations may, for example, allow distributed access, redundancy, decreased latency, etc.

An end user device 120 may request resources 130 from a website 115. In turn, data representing the resource 130 may be provided to the end user device 120 for presentation by the end user device 120. The data representing the resource 130 may also include data specifying a portion of the resource or a portion of a user display—for example, a small search text box or a presentation location of a pop-up window—in which advertisements may be presented or third party search tools may be presented.

To facilitate searching of these resources 130, the environment 100 may include a search system 135 that identifies the resources 130 by crawling and indexing the resources 130 provided by the publishers on the websites 115. Data about the resources 130 may be indexed based on the resource 130 to which the data corresponds. The indexed and, optionally, cached copies of the resources 130 are stored in a search index 140.

End user devices 120 may submit search queries 145 to the search system 135 over the network 110. In response, the search system 135 accesses the search index 140 to identify resources 130 that are relevant to the search query 145. The search system 135 identifies the resources 130 in the form of search results 150 and returns the search results 150 to the end user devices 120 in search results webpages. A search result 150 is data generated by the search system 135 that identifies a resource 130 that is responsive to a particular search query, and includes a link to the resource 130. An example search result 150 may include a webpage title, a snippet of text or a portion of an image extracted from the webpage, and the URL of the webpage.

Users that are interested in a particular subject may perform a search by submitting one or more queries 145 to the search system 135 in an effort to identify related information. For example, a user that is interested sports may submit queries 145 such as "sports," "football," or "baseball." In response to each of these queries 145, the user may be provided search results 150 that have been identified as responsive to the search query—that is, have at least a minimum threshold relevance to the search query, for example, based on cosine similarity measures or clustering techniques. The user may then select one or more of the search results 150 to request presentation of a webpage or other resource 130 that is referenced by a URL associated with the search result 150.

In some implementations, the virtual entity and equity system 105 may be used to quickly and efficiently establish a domain into a virtualized entity. For example, the virtual entity and equity system 105 may accept a domain from a user and then match entities or services with an interest in the domain so as to collaboratively build upon the domain. For example, if the user inputs a domain such as sports-teams.com, the system 105 may automatically suggest and/or match the input domain with features, designs, templates, developers, team members, etc. These suggestions/matches may be made, for example, based on keyword similarity (e.g., sports and/or team are similar to athletics, groups, stadiums, etc.), previous activity on the system 105 (e.g., of users, clients, partners, similar domains, etc.), and/or any other criteria for matching and/or suggesting results to a client's input domain. The domain, in some implementations, may be purchased and domain name system (DNS) managed outside of the system 105 previous to, or contemporaneous with, adding the domain to the system 105. In other implementations, the user may purchase the domain lease rights and technology sourcing directly through the system 105. In a more specific example, a domain of travel.com may be added to the system 105. Other related services or interested users may then decide to create content for travel.com (the primary domain), and in some implementations may create secondary domains and/or services based off the domain. For example, users may establish subdomains and/or secondary domains such as travel-plans.com, travel.com/plans, survey.travel.com, testing.travel.com, etc., providing travel plans to those that wished to travel under the umbrella of travel.com. Thus, the primary domain may perform as a promising nucleus for the development of a brand identity.

In some implementations, these secondary domains and/or services may be subject to their own conversion thresholds and/or managed/owned by clients and/or users that are the same as or different from—in whole or in part—the primary domain. For example, the client who owns travel.com on the system 105 may own and/or manage all or part of travelplans.com and/or travel.com/plans, or he or she may be entirely separate from the two websites.

In some other implementations of the virtual entity and equity system 105, domains may be matched to more than one type of entity. For example, a domain of travel.com may be matched to people, services, or software such as applications, scripting, or code. Further, in some implementations the system 105 may prescreen candidate entities, by user initiated and/or automatic processes, for acceptability prior to the match process. For example, candidate entities may be required to submit a resume, previous work history, or other proof of work product. In other implementations, the screening process may combined with a matching and/or recommendation process whereby users are matched and/or recommended for work based on the screening process.

Further, some implementations of the virtual entity and equity system 105 include a criteria and goal negotiation phase that may occur in conjunction with the matching process. For example, travel.com may specify that it wishes to have a developer entity create a travel plan section or feature for the travel.com domain, which may be treated as a separate entity as travelplans.com or travel.com/plans. The domain, travel.com, may require the developer to meet certain design or development requirements, such as designing the website entirely in hypertext markup language version 5 (HTML5). The developer may then need to adhere to these requirements, or negotiate with the domain to modify the requirements. If the developer successfully adheres to the original or modified requirements, then the developer may receive some form of compensation, the default compensation being equity-like trust shares in the developed virtual entity/domain. The amount of equity-like trust shares given to the developer may be determined by various methods. For example, the developer may contract for his services at $50 per hour, with the expectation that he may require one hundred hours to finalize development, valuing his contribution to the domain at $5000. This contribution value may then be compared to the estimated value of the domain—for example, travelplans.com may be valued at $500,000—and the developer may therefore have contributed one-hundredth of the value to travelplans.com. Accordingly, he may receive 1% of the shares for travelplans.com.

In some implementations, the system 105 may provide users, partners, and/or clients with documentation for their contributions. For example, a contributor to a virtual entity may receive an Internal Revenue Service (IRS)-type documentation form (e.g., IRS-1099, IRS-W2, etc.). The documentation may include information including, but not limited to, a contributor's contributions, a contributor's returns, a partner's investments, an entity's value, an equity holder's dividends, etc. In some implementations, the forms may be automatically populated for use with financial filing purposes (e.g., documentation of investments, federal taxes, state taxes, international financial investment recordation, etc.).

Additionally, some implementations of the virtual entity and equity system 105 include the ability to convert the equity-like trust shares earned by a developer entity into legal equity shares. This may occur, for example, by transforming (i.e., creating a corresponding legal entity based on the virtual entity) the domain into a legal entity (e.g., a corporation). This conversion may occur, for instance, when the developed domain reaches a threshold predefined by a domain's owner (i.e., a system 105 client), a party in majority control of the virtual entity, etc. For example, the system 105 client may set the conversion threshold when the domain receives a valuation of $100,000. Entities holding equity-like trust shares in the domain may then receive an equivalent legal equity share in the newly formed legal corporation. Thus, the system 105 platform may act as a platform for live company/entity creation and management where such an action may be most optimal.

In some implementations, the system 105 may allow users, clients, and/or partners to enter and/or exit from entity compensation and/or management at any number of points. For example, a client may allow any equity holder in the client's virtual entity to transfer that equity to another of the client's virtual entities at a proportional rate. For example, 2% equity in virtual entity A, with a valuation of $100,000, may convert to 1% equity in virtual entity B, with a valuation of $200,000. In other implementations, equity holders in a virtual entity may convert their virtual entity equity into real-world equity shares in a non-corresponding legal entity. For example, 2% equity in virtual entity A, with a valuation of $100,000, may convert to 1% equity in legal entity B, with a valuation of $200,000. In some implementations, conversions may be subject to conversion overhead (e.g., the system 105 and/or client may take 2% of the transfer value for allowing the conversion). Further, in some implementations, users, clients, and/or partners may sell all of their equity in virtual and/or legal entities to another individual (user, partner, client, and/or any other individual) for tangible and/or intangible compensation (e.g., currency, goods, etc.). This may, for example, occur in a physical and/or remote transaction (e.g., in person, over the phone, through a broker, through a digital exchange, etc.).

Other implementations of the virtual entity and equity system 105 may allow for a game-like components, or gamification, aspect to interaction with the system 105. For example, rewards may be given to the most efficient developers with respect to a project's timeline, multiple developers may compete to create the most valued new domain, or multiple developers may compete to make the most highly valued new component for a domain.

Some implementations of the virtual entity and equity system 105 may allow for solicitation of funds and/or offering of funding as part of the product or service compensation for equity. Members and users of a URL asset may be awarded equity compensation and/or other benefits by contributing capital toward the theoretical or stated value of the URL asset. If fashiondesign.com has a stated, documented value along with an offering on the URL asset, then members and visitors may offer capital compensation to acquire some equity-based value of the URL asset. For example, if a URL asset—for instance, fashiondesign.com—is worth a theoretical value of $100,000, then 10% of the equity-like trust shares may be available at $10,000 or an equivalent value. Members and users may also acquire rights into the URL asset at the stated and documented price point. For example, domain managers and/or contractors may solicit funds from end-users to accomplish many goals including, but not limited to, building capital for the domain research and development, attaining the corporate transformation threshold, or funding domain projects. In some other implementations, financing may also be offered to buy directly into a percentage value of the URL asset. For example, a partner may contribute currency for equity in the virtual entity instead of contributing development time/experience. In some further implementations, the system 105 may implement and/or integrate an exchange for trading equity on the exchange. For example, a client with a virtual entity may list on the exchange that he or she will exchange $10,000 currency for 10% equity in the virtual entity. In other examples, multiple users with equity shares or equity share types (e.g., where the client implements various types of equity shares, such as common, preferred, etc.) may exchange their equity shares amongst themselves. In some implementations, the system 105 and/or client may retain a percentage of the exchange value for exchanges. For example, if the client wishes to exchange $10,000 from a partner for 10% of the client's virtual entity, the system 105 may take a percentage (e.g., 2%) of the $10,000 (i.e., $200); the client and/or the partner may be required to pay the exchange fees (i.e., pay $10,200 in total); the system 105 may take a percentage of the equity in the virtual entity on the system 105's behalf (e.g., take 0.2% equity in the virtual entity), etc.

Further, some implementations of the virtual entity and equity system 105 may allow for a content and/or entity management component. For example, the system 105 may host website; store development, legal, and/or code documents; maintain team member information; log hours and financials on a per domain basis; facilitate marketing and/or monetization strategies; and/or provide a contact and negotiation platform. Some examples of marketing and/or monetization strategy tools may include, but are not limited to, pay-per-click advertising (PPC), cost-per-impression advertising (CPI/CPM), affiliate programs, paid membership programs, and/or user-data analysis. Such a content and/or entity management component may allow for an all-in-one interface for user interactions, development, and day-to-day operations for entities.

Other implementations of the virtual entity and equity system 105 may include, but is not limited to, a document management, a multiple posting, user base emailing, newsletter, and/or code management components. For example, the document management component may allow a user, client, and/or team member(s) of a website/virtual entity of the system 105 to track, record, query, and retrieve documents associated with a virtual entity/website (e.g., task listings, mission statements, team member applications, etc.). The multiple posting component may allow team member(s) of a website/virtual entity of the system 105 to post media resources (e.g., announcements, videos, etc.) to social media accounts associated with the website/virtual entity. For example, the multiple posting component may post a new website feature to FACEBOOK (FACEBOOK is a registered trademark of Facebook, Inc., a Delaware corporation, located at 1601 Willow Road, Menlo Park, Calif. 94025), TWITTER (TWITTER is a registered trademark of Twitter, Inc., a Delaware corporation, located at 1355 Market Street, Suite 900, San Francisco, Calif. 94103), GOOGLE+ (GOOGLE+ is a registered trademark of Google Inc., a Delaware corporation, located at 1600 Amphitheatre Parkway, Mountain View, Calif. 94043), INSTAGRAM (INSTAGRAM is a registered trademark of Instagram, LLC, a Delaware limited liability company, located at 1601 Willow Road, Menlo Park, Calif. 94025), and/or any other social media services. The user base emailing and newsletter components may contact user associated with the website/virtual entity with information via email, phone, text message, and/or physical mail including, but not limited to, website/virtual entity updates, announcements, advertisements, etc. The code management component may act similarly to the document management component, but may be more specifically devised to manage the website/virtual entity's software code (e.g., the programming that comprises the website, the database containing data associated with the website/virtual entity, etc.). In some implementations, the code management component may observe the amount of code generation by a user, groups of users, and/or the user base as a whole; observe the amount of time spent generating code (e.g., the efficiency of a user's development), and/or any other discrete measurements of the user's activities on the system 105 in relation to creating, inputting, modifying, maintaining, and/or otherwise working with code. In some other implementations, the code management component may include a content management system (CMS) for publishing, editing, organizing, modifying content, deleting, and maintaining website content (e.g., blogs, news, shopping, etc.). Some examples of content management systems may include, but are not limited to, DRUPAL (DRUPAL is a registered trademark of Buytaert Dries, an individual, located in Langveld, 2 bus 12 B-2600, Berchem, Belgium), WORDPRESS (WORDPRESS is a registered trademark of the WordPress Foundation, a non-profit public benefit corporation, located at 660 4th Street, #119, San Francisco, Calif. 94107), etc.

When search results 150 are requested by an end user device 120, the virtual entity and equity system 105 may receive a request for data to be provided with the resource 130 or search results 150. In response to the request, the virtual entity and equity system 105 selects data that are determined to be relevant to the search query. In turn, the selected data are provided to the end user device 120 for presentation with the search results 150.

For example, in response to the search query "travel," the system 105 may present the user with relevant travel-related results. If the user selects—for example, by clicking or touching—the search result 150, the end user device 120 may be redirected, for example, to a webpage containing compiled travel plans for vacationers. This webpage may include, for example, where to go on a vacation, what restaurants to eat at, which landmarks to see, etc.

In some implementations, the returned webpage may include all of the resources 130 that are required to complete a financial transaction for a service or product relevant to the virtual entity and equity system 105. For example, the webpage may enable the user to add products to an electronic "shopping cart" and enter payment and/or shipping information. Some of these webpages may be secure webpages that protect the users' payment information and/or other sensitive information—for example, the user's address and name. Additionally, the website may include code that completes financial transactions—such as credit card transactions, online payment transactions, or other financial transactions.

In other implementations, the returned webpage may include code that references a marketplace apparatus 155 that is used to complete the transaction. The marketplace apparatus 155 is a data processing apparatus that is configured to facilitate sales transactions between buyers and sellers over the network 110. The marketplace apparatus 155 may be configured to provide electronic "shopping carts," perform financial transactions, provide transaction confirmation data to the buyer and/or seller, and/or provide shipment-tracking information if the user purchases physical goods, such as artist or author merchandise.

For example, a webpage may include code that causes a checkout user interface element—for example, a checkout button—to be presented to the user. In response to the user clicking on the checkout user interface element, checkout data may be provided to the marketplace apparatus 155 indicating that the user is ready to agree to an exchange or complete a purchase. The checkout data may include product identifiers specifying the products that the user has selected to purchase, quantities of each product that the user has selected to purchase, and prices associated with the selected products. These identifiers may be in addition to terms of the exchange or included within the terms of the exchange. In response to receipt of the checkout data, the marketplace apparatus 155 may provide the user with a transaction interface that enables the user to submit payment information and shipping information to complete the transaction. Once the transaction is complete, the marketplace apparatus 155 may provide the user with confirmation data confirming the details of the transaction.

The payment interface that is provided by the marketplace apparatus 155 may be accessed by the user at a secure network location that is referenced by a URL. The URL may be formatted to include data identifying a referring webpage from which the user navigated to the payment interface. For example, the URL that directs a user to the payment interface may be https://www.examplepaymentinterface.com/~id1234/PartnerA.com, where "id1234" is a unique identifier for Partner A, and PartnerA.com is the domain address for Partner A's website.

The virtual entity and equity system 105 may also make use of advertisements 160 based on user actions on the website. As a user makes search queries 145 and receives search results 150, the user's activities may be represented in the search index 140 with a session identifier. This session identifier may be the user's Internet Protocol (IP) address, unique browser identifier, or any other similar identifier. Based on the user's interactions and intent, the system 105 may display advertisements 160 from advertisers 125 that target the user's interactions. The determination of relevance based on the user's interactions may also be based upon historical data stored in the advertisement data store 165.

In some implementations, the advertisement data store 165 may also store user interaction data specifying user interactions with presented advertisements (or other content items). For example, when an advertisement is presented to the user, data may be stored in the advertisement data store 165 representing the advertisement impression. Further, in some implementations, the data is stored in response to a request for the advertisement that is presented. For example, the ad request may include data identifying a particular cookie, such that data identifying the cookie may be stored in association with data that identifies the advertisement(s) that was or were presented in response to the request.

When a user selects—for example, clicks or touches—a presented advertisement, data is stored in the advertisement data store 165 representing the user selection of the advertisement. In some implementations, the data may be stored in response to a request for a webpage that is linked to by the advertisement. For example, the user selection of the advertisement may initiate a request for presentation of a webpage that is provided by (or for) the advertiser. The request may include data identifying the particular cookie for the user device, and this data may be stored in the advertisement data store 165. Additionally, if an advertiser has opted-in to have click-through traffic tracked, when a user performs an action that the user has defined as a click-through, data representing the click-through may be provided to the virtual entity and equity system 105 and/or stored in the advertisement data store 165.

In some implementations, user interaction data that are stored in the advertisement data store 165 may be anonymized to protect the identity of the user with which the user interaction data is associated. For example, user identifiers may be removed from the user interaction data. Alternatively, the user interaction data may be associated with a hash value of the user identifier to anonymize the user identifier. In some implementations, user interaction data are only stored for users that opt-in to having user interaction data stored. For example, a user may be provided an opt-in/opt-out user interface that allows the user to specify whether they approve storage of data representing their interactions with content.

When the virtual entity and equity system 105 and the search system 135 are operated by a same entity, user interaction data may be obtained by the virtual entity and equity system 105 in a manner similar to that described above. For example, a cookie may be placed on the user device by the search system 135, and the user interactions may be provided to the virtual entity and equity system 105 using the cookie.

When the virtual entity and equity system 105 and the search system 135 are operated by different entities that do not share user interaction data as described above, the virtual entity and equity system 105 may utilize other data collection techniques to obtain user interaction data. For example, the virtual entity and equity system 105 may obtain user interaction data from users that have agreed to have interactions tracked—that is, he or she opted-in. Users may opt-in, for example, to increase the relevance of content items and other information that are provided to the users, or to obtain a specified benefit such as use of an application or to obtain discounts for other services. As described above, the user interaction data obtained from these users may also be anonymized in order to protect the privacy of the users that opt-in. This user interaction data may also be stored in the advertisement data store 165.

The virtual entity and equity system 105 may use measures of click-through—or another targeted-user interaction—to determine effectiveness measures for content items that are provided to users. For example, effectiveness of a particular content item may typically be considered to be directly proportional to the portion of all users that interacted with the content item and that are resulting in click-through impressions. These measures of click-through may be used, for example, to adjust content selection algorithms to increase effectiveness of content items that are provided to users. For example, several different consent selection algorithms may be used to select content and click-through rates for each of the algorithms, which may then be compared to determine which algorithm(s) are providing more effective content items—that is, content items having higher effectiveness measures.

As noted above, click-through data may not be available for some content items—for example, because the advertiser has not opted-in to click-through tracking—and click-throughs may not be uniformly defined across all advertisers. Therefore, it may be difficult to evaluate effectiveness of content items by relying only on click-through data. However, predictive interactions may be used to evaluate content item effectiveness, as described in more detail below.

The environment 100 may also include an interaction apparatus 170 that selects predictive interactions with which content item effectiveness may be evaluated. The interaction apparatus 170 is a data processing apparatus that analyzes target interaction data and prior interaction data, for example stored in an interaction data store 175, to identify those prior interactions that are performed, with at least a threshold likelihood, by users prior to performance of the target interaction. For example, the interaction apparatus 170 may determine that users searching for a certain type of frequently mistyped product—for example, "capital venture"—mean to search for a different term—such as "venture capital." If the interaction apparatus 170 may determine that a threshold portion of all users committed this error, it may suggest or redirect to the correct search by default as a predictive interaction for the search.

In some implementations, the interaction apparatus 170 may also determine that the portion of all users that performed a predictive interaction, but did not perform the target interaction. The interaction apparatus 170 may use this determination as an indication of the false positive rate that may occur using the predictive interaction as a proxy for the target interaction.

Once the interaction apparatus 170 selects the predictive interactions, the interaction apparatus 170 determines whether additional user interaction data include predictive interaction data. The additional user interaction data may be user interaction data that do not include target interaction data. For example, the additional user interaction data may be user interaction data for user interactions with a website for which click-throughs are not tracked. When the interaction apparatus 170 determines that the additional user interaction data include the predictive interaction data, the user from which the user interaction data was received may be considered a click-through user for purposes of determining content item effectiveness.

In some implementations, the interaction apparatus 170 may assign each click-through user a weight that represents the relative importance of the click-through user's interactions for computing content item effectiveness. For example, a user that performs many different predictive interactions may have a higher weight than a user that performs only one predictive interaction. In some implementations, the interaction apparatus 170 may assign a same weight—that is, 1.0—to each click-through user. This concept may be used to more accurately correlate and suggest content to users. For example, if a user typically interacts with results corresponding to new entity or service proposals, then the system 105 may weight results of new entity or services above older entities. Additionally, the system 105 may give greater weight to a user that more closely correlates to another user. For example, if one user typically interacts or searches for software companies in a similar fashion to the way in which another user typically interacts or searches, then the searches or interactions of one user may be suggested to the other in certain circumstances. Other correlation methods may also be used, such as cosine similarity measures, clustering techniques, or any other similar technique.

Further, in some implementations, the interaction apparatus 170 may be used to determine a similarity weight to other users, which is a value representing an objective similarity between a first user and a second user based on a multitude of factors including, but not limited to, number of shared product categories, frequency of interaction with system, etc. For example, if User A shares five interest in common with User B but shares ten interests in common with User C, then User A may be assigned a higher similarity weight with User C than with User B. In some implementations, the factors affecting the similarity weight may be given equal weight, while in other implementations the weight given to each factor may vary based on some subjective or objective weighing scheme. In some implementations, suggestions may be given to a user based on the similarity weight, among many other possible factors. For example, matching a user with another user for some purpose on the system 105 may use the relative similarity weights to rank users higher or lower on lists. Additionally, similarity weights and suggestions may be made based on, but not limited to, the number of entities or services on the system, the frequency of interaction with the system, the amount of time spent on projects, the quantity and/or quality of feedback from co-collaborators, etc.

The environment 100 may also include a system database 180 to receive and record information regarding the virtual entity and equity system 105, the interaction apparatus 170, websites 115, advertisers 125, end user devices 120, the marketplace apparatus 155, and/or any other data useful to the environment 100. For example, information regarding end user devices 120 and end user identifiers may be stored and analyzed to determine user activity on a client website.

In some implementations, data that is stored in the system database 180 may be anonymized to protect the identity of the user with which the user data is associated. For example, user identifiers may be removed from the user data to provide to third-party clients. Alternatively, the user data may be associated with a hash value of the user identifier to anonymize the user identifier. In some implementations, data are only stored for users that opt-in to having their data stored. For example, a user may be provided an opt-in/opt-out user interface that allows the user to specify whether they approve storage of data associated with the user.

While the system 105 may operate with only one of each component (e.g., one system 105, one input website, one website portal, one virtual entity, one system 105 frontend, one system backend, one end user, one client, one end user device, etc.), the system 105 may be benefitted by multiple of these components (and/or in some instances greatly benefitted by a mass amount of said components). For example, the existence and activity of a plurality of clients and/or users on the system 105 may foster greater creativity and flexibility of virtual entities on the system 105 and/or skilled individuals to develop those virtual entities as compared to creative and intellectual stagnation that may typically occur with a small user base. Without sufficient clients, users may be unable to find a development task to participate in (potentially leading to the user leaving the system 105), and without sufficient users to develop for the virtual entities, the clients may be unlikely to reach conversion thresholds. Additionally, features such as game-like interaction of the system 105 may be difficult or impossible without at least a small plurality of active competitors on the system 105; however, as the number of active users increases, the likelihood of a successful ecosystem for the game-like system 105 features also increases and may tend to lead to greater success of the system 105 and user activity (quantity and quality) compared to a small user base. Moreover, the existence of a plurality of virtual entities and/or website portals may act to increase partnership interest, publicity, and sustainability of the system 105. Partners may be leery and/or unwilling to invest in a situation where the ecosystem is largely stagnant, and having a vibrant and active base of users, virtual entities, and website portals helps to ensure interest. Further, the existence of a plurality of external data sources may help diversify the collection of data for valuation and/or any other system 105 purpose and may guard against informational corruption and/or bias. For example, as the range and number of collected data sources tends to increase, the average collected values may tend to normalize at a figure that is more accurate than may have otherwise been collected from a smaller set of data points.

Figure 2:
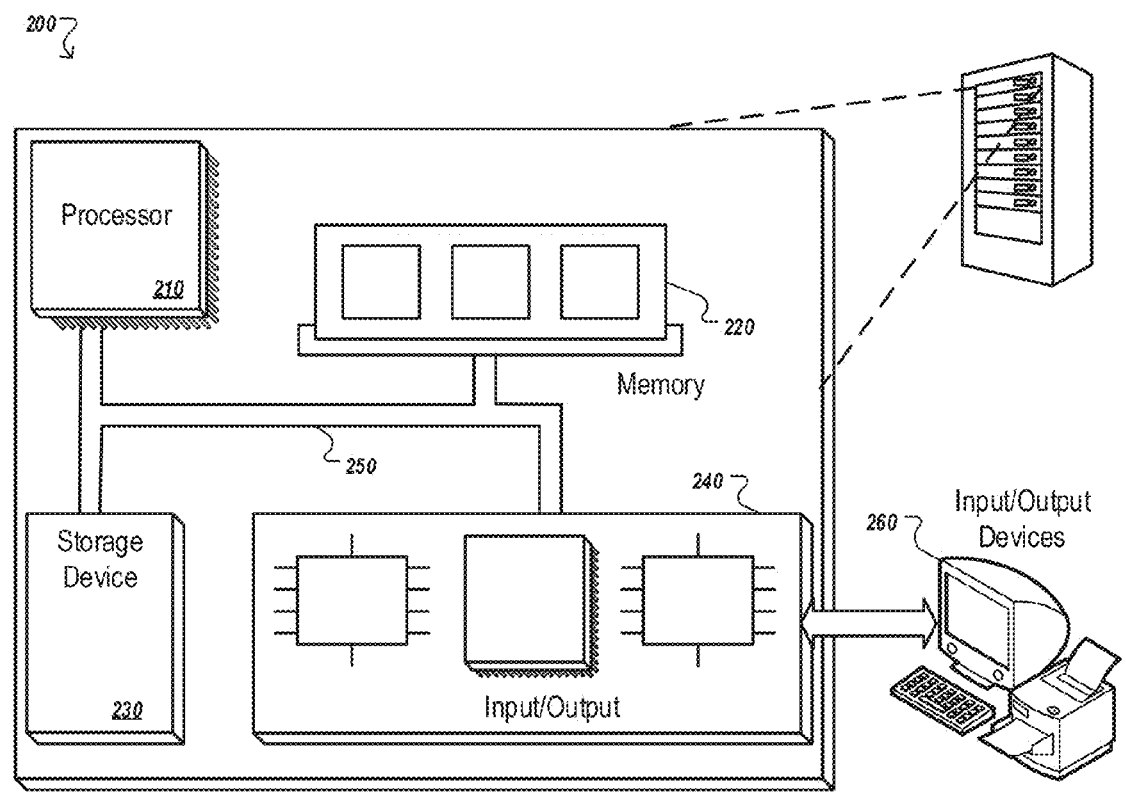
FIG. 2 is system diagram of an example computer system that may be used to create the virtual entity and equity system.

FIG. 2 is a block diagram of an example computer system 200 that may be used to provide an online trading platform and interconnected services, as described above. The system 200 includes a processor 210, a memory 220, a storage device 230, and an input/output device 240. Each of the components 210, 220, 230, and 240 may be interconnected, for example, using a system bus 250. The processor 210 is capable of processing instructions for execution within the system 200. In one implementation, the processor 210 may be a single-threaded processor. In another implementation, the processor 210 may be a multi-threaded processor. The processor 210 is capable of processing instructions stored in the memory 220 or on the storage device 230.

The memory 220 stores information within the system 200. In one implementation, the memory 220 is a computer-readable medium. In one implementation, the memory 220 is a volatile memory unit. In another implementation, the memory 220 is a nonvolatile memory unit.

The storage device 230 is capable of providing mass storage for the system 200. In one implementation, the storage device 230 is a computer-readable medium. In various different implementations, the storage device 230 may include, for example, a hard disk device, an optical disk device, or some other large capacity storage device.

The input/output device 240 provides input/output operations for the system 200. In one implementation, the input/output device 240 may include one or more of a network interface devices, for example an Ethernet card; a serial communication device, for example an RS-232 port; and/or a wireless interface device, for example an 802.11 card. In another implementation, the input/output device may include driver devices configured to receive input data and send output data to other input/output devices, for example keyboard, printer and display devices 260. Other implementations, however, may also be used, such as mobile computing devices, mobile communication devices, set-top box television client devices, etc.

Although an example processing system has been described in FIG. 1, implementations of the subject matter and the functional operations described in this specification may be implemented in other types of digital electronic circuitry, or in computer software, firmware, or hardware, including the structures disclosed in this specification and their structural equivalents, or in combinations of one or more of them.

Embodiments of the subject matter and the operations described in this specification may be implemented as a method, in digital electronic circuitry, or in computer software, firmware, or hardware, including the structures disclosed in this specification and their structural equivalents, or in combinations of one or more of them. Embodiments of the subject matter described in this specification may be implemented as one or more computer programs—that is, one or more modules of computer program instructions encoded on computer storage medium for execution by, or to control the operation of, data processing apparatus. Alternatively or in addition, the program instructions may be encoded on an artificially-generated propagated signal, for example a machine-generated electrical, optical, or electromagnetic signal, which is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical components or media (e.g., multiple CDs, disks, or other storage devices).

The operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus may include special purpose logic circuitry, for example an FPGA (field programmable gate array) or an ASIC (application-specific integrated circuit). The apparatus may also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing, and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program can, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example an FPGA or an ASIC.

Processors suitable for the execution of a computer program include, by way of example, both general and special purpose microprocessors, and any one or more processors of any kind of digital computer. Typically, a processor may receive instructions and data from a read-only memory or a random access memory or both. The essential elements of a computer are a processor for performing actions in accordance with instructions and one or more memory devices for storing instructions and data. Typically, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, for example a mobile telephone, a personal digital assistant (PDA), a mobile audio or video player, a game console, a Global Positioning System (GPS) receiver, or a portable storage device (e.g., a universal serial bus (USB)

flash drive), to name just a few. Devices suitable for storing computer program instructions and data include all forms of nonvolatile memory, media and memory devices, including by way of example semiconductor memory devices, for example erasable programmable read-only memory (EPROM), electrically erasable programmable read-only memory (EEPROM), and/or flash memory devices; magnetic disks, for example internal hard disks or removable disks; magneto-optical disks; and/or compact disk read-only memory (CD-ROM) and digital video disk real-only memory (DVD-ROM) disks. The processor and the memory may be supplemented by, or incorporated in, special purpose logic circuitry.

To provide for interaction with a user, embodiments of the subject matter described in this specification may be implemented on a computer having a display device (e.g., a cathode ray tube (CRT), liquid crystal display (LCD), or organic light-emitting diode (OLED) monitor), for displaying information to the user and a keyboard and a pointing device, e.g., a mouse or a trackball, by which the user may provide input to the computer. These may, for example, be desktop computers, laptop computers, smart TVs, etc. Other mechanisms of input may include portable and or console entertainment systems such as GAME BOY and/or NINTENDO DS ((GAME BOY, GAME BOY COLOR, GAME BOY ADVANCE, NINTENDO DS, NINTENDO 2DS, and NINTENDO 3DS are registered trademarks of Nintendo of America Inc., a Washington corporation, located at 4600 150th Avenue NE, Redmond, Wash. 98052), IPOD (IPOD is a registered trademark of Apple Inc., a California corporation, located at 1 Infinite Loop, Cupertino, Calif. 95014), XBOX (e.g., XBOX, XBOX ONE) (XBOX and XBOX ONE are a registered trademarks of Microsoft, a Washington corporation, located at One Microsoft Way, Redmond, Wash. 98052), PLAYSTATION (e.g., PLAYSTATION, PLAYSTATION 2, PS3, PS4, PLAYSTATION VITA) (PLAYSTATION, PLAYSTATION 2, PS3, PS4, and PLAYSTATION VITA are registered trademarks of Kabushiki Kaisha Sony Computer Entertainment TA, Sony Computer Entertainment Inc., a Japanese corporation, located at 1-7-1 Konan Minato-ku, Tokyo, 108-0075, Japan), OUYA (OUYA is a registered trademark of Ouya Inc., a Delaware corporation, located at 12243 Shetland Lane, Los Angeles, Calif. 90949), WII (e.g., WII, WII U) (WII and WII U are registered trademarks of Nintendo of America Inc., a Washington corporation, located at 4600 150th Avenue Nebr., Redmond, Wash. 98052), etc.

Other kinds of devices may be used to provide for interaction with a user as well; for example, feedback provided to the user may be any form of sensory feedback, for example visual feedback, auditory feedback, or tactile feedback; and input from the user may be received in any form, including acoustic, speech, or tactile input. In addition, a computer may interact with a user by sending documents to and receiving documents from a device that is used by the user; for example, by sending webpages to a web browser on a user's client device in response to requests received from the web browser.

Some embodiments of the subject matter described in this specification may be implemented in a computing system 200 that includes a back-end component (e.g., a data server) or that includes a middleware component (e.g., an application server) or that includes a front-end component (e.g., a client computer having a graphical user interface or a Web browser through which a user may interact with an implementation of the subject matter described in this specification) or any combination of one or more such back-end, middleware, or front-end components. The components of the computing system 200 may be interconnected by any form or medium of digital data communication, for example a communication network. Examples of communication networks include a local area network (LAN) and a wide area network (WAN), an inter-network (e.g., the Internet), and peer-to-peer networks (e.g., ad hoc peer-to-peer networks).

The computing system 200 may include clients and servers. A client and server are typically remote from each other and typically interact through a communication network. The relationship of client and server arises by virtue of computer programs running on the respective computers and having a client-server relationship to each other. In some embodiments, a server transmits data (e.g., an HTML webpage) to a client device (e.g., for purposes of displaying data to and receiving user input from a user interacting with the client device). Data generated at the client device (e.g., a result of the user interaction) may be received from the client device at the server.

FIGS. 3-9 depict screen shots for some embodiments of the present novel technology (e.g., an embodiment of FIG. 1). With regard to FIGS. 3-9, a typical transaction may include the virtual entity and equity system 105; a client (e.g., the company that adds a website into the system 105) that has one or more websites (e.g., CompanyA.com, CompanyA.org, etc.) that are associated with the client on the virtual entity and equity system 105; and an end user, who uses end user devices 120 to connect to the website 115 and/or the system 105 frontend.

Figure 3:
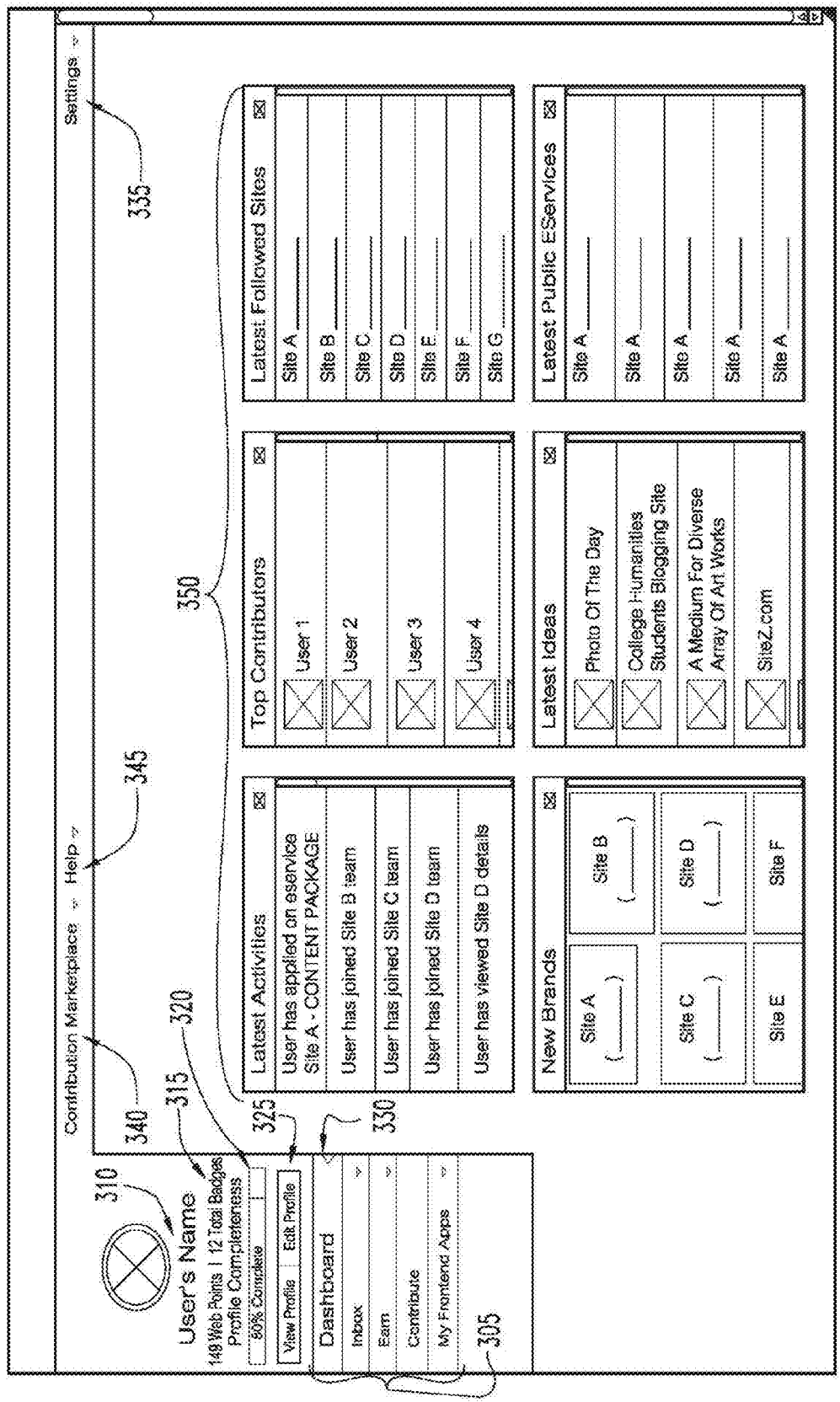
FIG. 3 depicts a screen shot of an implementation of the virtual entity and equity system's frontend interface displaying a frontend dashboard.

FIG. 3 depicts a screen shot of an implementation of the virtual entity and equity system's 105 frontend interface displaying a dashboard interface, typically including the frontend dashboard 300; frontend panel(s) 305; user identifier(s) 310; user participation notification(s) 315; user profile progress bar(s) 320; user profile link(s) 325; dashboard link(s) 330; settings link(s) 335; marketplace link(s) 340; help link(s) 345; and dashboard widget(s) 350.

The frontend dashboard 300 typically may include widgets to provide an at-a-glance assessment of activities, updates, and users of the system 105 (for example, though the dashboard widget(s) 350). Further, the frontend dashboard 300 may provide profile information to a logged-in user and allow the logged-in user to make changes to his or her profile and/or settings. The frontend dashboard 300 may also be used to convey updates, announcements, changes, or any other information to a user (logged-in or otherwise) concerning the system 105. For example, the system 105 may inform a user of a recent change to billing routines, special offers, or new features through the user of a popup message, a captive portal, or any other mechanism of information conveyance to the user.

The frontend panel(s) 305 typically may provide a client and/or system user with links and/or other mechanisms of navigating the system 105 frontend interface, browsing features of the system 105 frontend interface, and/or otherwise interacting with the system 105 frontend interface. While the frontend panel(s) 305 may be a single panel, as depicted in FIG. 3, there may be an unlimited number of panels generated on the system 105 frontend interface. Further, while the frontend panel(s) 305 may be located on the left of the system 105 frontend interface as depicted in FIG. 3, they may also be located at any other point of the system 105 frontend interface as well.

The frontend panel(s) 305 may display navigational links (e.g., "Dashboard," "Inbox," "Earn," etc.) that a user may click on to navigate to that component and/or webpage on the system 105. In some implementations, navigational links may be supplemented with and/or replaced by icons. For example, the "Dashboard" navigational may have an icon resembling a home located adjacent to the "Dashboard" link, the "Inbox" navigational link may have an icon resembling an envelope located adjacent to the "Inbox" link, etc.

In some implementations, the frontend panel(s) 305 may generate and/or display navigational links dynamically depending on the context of user's location in the system 105 frontend. For example, if the user is located on a webpage for managing teams (e.g., as in FIG. 5), the frontend panel(s) 305 may provide additional navigation links respective of the content of the webpage (e.g., the frontend team applications webpage 500). In other implementations, the frontend panel(s) 305 may remove navigational links to streamline and/or otherwise better tailor the content of the frontend panel(s) 305 to the content of the presently displayed webpage.

In other implementations, the frontend panel(s) 305 may be in the form of a dropdown list and/or selector mechanism that may list options and/or features associated for the user account that the user may select. For example, the selector may initially display "Navigation" and upon a user clicking the selector field, the selector may then display relevant system 105 frontend interface navigation options (e.g., Dashboard, Inbox, Earn, Contribute, etc.).

In some implementations, the system panel(s) 305 may not be displayed at all to an individual viewing the system 105 frontend interface. For example, navigation to the various aspects of the system 105 frontend interface may be accomplished by generating a separate menu (e.g., by pressing a menu button on an end user device 120), performing a symbolic gesture (e.g., swiping, scrolling, or otherwise interacting with an end user device 120), and/or any other mechanism that may generate the separate menu for navigation.

The user identifier(s) 310 typically may be a system user's real-world name, an alias, and/or some other form of identifying a user on the system 105. For example, the user identifier(s) 310 may read, "Tom Jones," "Tom_J," "Developer_Tom," "Jones_Partner, LLC," and/or any other acceptable input. In some implementations, every user identifier(s) 310 may be unique, whereas in other implementations, user identifier(s) 310 may be repeatable and/or not unique. For example, one implementation may not allow two different users to both have "Tom_J" as user identifier(s) 310, while others may allow both to have the same user identifier(s) 310 of "Tom_J," and while still others may allow both to use "Tom_J" but may require a unique differentiator (e.g., "Tom_J_[systemID]" where [systemID] may correspond to a value stored in a system 105 database (e.g., the system database 180)).

In some implementations, additional user identifier(s) 310 may be included in addition to, or in the place of, the user's name and/or alias as described above. For example, an image, icon, or other text and/or graphic may represent the user as user identifier(s) 310. As shown in FIG. 3, a placeholder may contain the user identifier(s) 310 (e.g., the circle above the user name field (user identifier(s) 310) may be populated with a user's image, avatar, and/or any other representation for the user account). In some implementations, the additional representation may be a default representation provided by the system 105 (e.g., a profile view of a human, an animal picture, a block of color, etc.), while in other implementations, it may simply by an empty or near-empty placeholder (e.g., with an "X" or the like contained within the placeholder) if and until the user adds a different representation.

The user participation notification(s) 315 typically may be generated and/or displayed to the user as an indication of the participation and/or activity on the system 105. For example, a user may get twenty Web Points for creating an account, another ten Web Points for signing up for a task, a Badge (e.g., a stylized digital icon that may appear next to the user's system 105 avatar and/or on the user's system 105 user profile) for successfully completing the task, another Badge for becoming a team member for a virtual entity, etc. While FIG. 3 depicts only two user participation notification(s) 315, the system 105 frontend interface may generate and/or display an unlimited number of user participation notification(s) 315.

In some implementations, similar to as described above, user participation notification(s) 315 may contribute to a game-like nature using game-like components (gamification) of the system 105, wherein users may receive different titles, ranks, and/or digital badges displayed on a user's account depending on their progress, participation, and/or activity on the system 105 and/or system 105 frontend interface. Such gamification of the system 105 may increase user activity such as participation, development, enjoyment, and return rates, to name only a few. In other implementations, the game-like components may exist and function with any other component of the system 105 and/or by themselves. For example, rewards may be given to the most efficient developers with respect to a project's timeline, multiple developers may compete to create the most valued new virtual entity, or multiple developers may compete to make the most highly valued new component for a website.

In further implementations, the system 105 may use and/or enable game-like components to incentivize, accelerate, and/or otherwise modify user activity on the system 105 and/or development of virtual entities and/or components of virtual entities. In some implementations, the system 105 may provide ephemeral and/or digital-only incentives, such as badges, avatars, ranks, and/or the like. For example, after a user on the system 105 successfully applies to and completes tasks for ten virtual entities, the system 105 may assign a badge indicating that user's task completion for those ten virtual entities (e.g., a gold medal next to the user's avatar inscribed with the number "10"). Other implementations may increment and/or stack this inscription (e.g., the inscription may read "20" after the user completes twenty tasks for virtual entities. In another example, the system 105 may give ranks and/or to users and/or clients based on activity, participation, efficiency, and/or any other metric. Thus, new users may be given a title of "New Members," users that frequently apply to management positions (e.g., CEO, CTO, etc.) of virtual entities may be given a title of "Upper Management Material," low-contribution partners may receive a title of "Backer," high-contribution partners may receive a title of "Angel," etc. These badges, avatars, ranks, etc. may last for a temporary period of time (e.g., a rank of "Top Developer" may reset each week), whereas other badges, avatars, ranks, etc. may remain indefinitely (e.g., the title of "Backer").

In other implementations, the system 105 and/or a client may incentivize activity and/or development by rewarding developers and/or partners with more tangible incentives, such as equity shares in the virtual entity, instant monetary rewards in currency (e.g., bounties for creating features for the virtual entity), and/or the like. For example, to incentivize developers to work on a client's virtual entity, the client may reward the first three developers to complete key components for the virtual entity with 1% equity in the virtual entity, which may then become 1% equity in the legal entity (if the legal entity may be created at some point in the future). In another example, a client may incentivize his or her first partners by rewarding the first five partners to contribute over $1000 with an additional 1% equity share over the equity value of the $1000 contribution (i.e., if the virtual entity is worth $100,000, $1000 may net the partner 1% equity in virtual entity, but the incentive would actually give those first five partners 2% equity in the virtual entity). In yet another example, the system 105 may pledge to transfer 5% of an entity of a contributing partner's choice after the contributing partner invests $1000 in at least ten virtual entities on the system 105.

In some implementations, the game-like nature of the system 105 may act like a competition with static and/or interactive leader boards, rankings, etc. For example, and in addition to the above tangible and intangible rewards for participation in challenges and/or competitions on the system 105, the system 105 monitors the activities of users and then may provide a leader board of the current, top-rated users on the system 105 in a variety of categories. For example, developers may be ranked on their coding efficiency based on the system 105 observing the lines of code they submit to the system 105, the time that it took to complete those lines of code, etc. In another example, designer-developers may have designs that have been the subject of polls conducted by the system 105 and then ranked by some or all of the system 105 users, and those designer-developers with the highest aggregate and/or average scores may be ranked highest on a designer-developer leader board. In yet another example, the most successful clients for developing new virtual entities may be placed in a leader board based on the number of virtual entities they have created, the aggregate and/or average valuation of their virtual entities, the number of virtual entities that the client has converted to legal entities (i.e., how many virtual entities have reached conversion thresholds), what was/were the conversion threshold values set at, how much publicity have the client's legal entities generated, the time elapsed between creating a virtual entity and converting to a legal entity, etc. In yet another example, users and/or clients who create secondary, subdomains from a primary domain (e.g., creating travel.com/plans to expand upon travel.com) may be ranked on a leader board based upon the quantity (e.g., net volume of user visits) and/or quality (e.g., unique visitors, repeat visitors, length of visit, activity on the site, clickthrough conversions, etc.) of traffic to these subdomains, how traffic to the primary domain increased in quantity and/or quality, etc. Still other leader board examples may include most active partners, clients with the fastest conversions, users involved in the greatest number of virtual entities, users with the greatest average and/or aggregate equity shares, highest rated users, most interactive virtual entity website portals, highest compensating virtual entities, fastest growing user base for a virtual entity, most applied to virtual entities for tasks and/or team positions, and so on. Data for these rankings may be calculated based on data measured, detected, stored, and/or queried on the system 105 (e.g., stored in the system database 180) and calculated—in whole or in part—totally user initiated (e.g., calculated on the fly when a system 105 user makes a request on a leader board webpage), automatically (e.g., every hour, day, week, month, etc.), and/or semi-automatically (e.g., prompts triggered by system 105 to an administrator, but the administrator must initialize the action).

The user profile progress bar(s) 320 typically may be generated and/or displayed to the user as an indication of the user's progress and/or activity on the system 105. For example, a user may get 20% completion for creating an account, another 10% for signing up for a task, another 20% for successfully completing the task, another 20% for becoming a team member for a virtual entity, etc. While FIG. 3 depicts only one user profile progress bar(s) 320, the system 105 frontend interface may generate and/or display an unlimited number of user profile progress bar(s) 320.

In some implementations, there may be only one method of reaching 100% completion (e.g., user must do A, B, C, D, and E), whereas in other implementations, there may be multiple methods of reaching 100% completion of the user profile progress bar(s) (e.g., user may do A, B, C, D, and E; or A, C, D, E, and F; or B, D, E, and G; etc.). Thus, each user may have to go through the same user development process to complete his or her user profile progress bar(s) 320, whereas other implementations may allow more flexibility to complete the profile and encourage user selection of activities to increase user profile progress bar(s) 320 levels.

In some other implementations, similar to as described above, user profile progress bar(s) 320 may contribute to a gamification of the system 105.

The user profile link(s) 325 typically may allow a system user to view, modify, and/or perform other activities associated with his or her system 105 user account profile. The system 105 user account profile may list, but is not limited to, the user's current memberships, partnerships, virtual entities, completed tasks, assigned tasks, not completed/failed tasks, reviews from other users, resumes, skills, multimedia created by and/or linked to the user, etc.

In some implementations, the user profile link(s) 325 may appear as two buttons and/or links (as depicted in FIG. 3), or the user profile link(s) 325 may take any other form (e.g., hyperlinks, clickable icons/graphics, etc.). In some other implementations, the user profile link(s) 325 may simply be a single link, button, icon, and/or other mechanism, whereas in other implementations, the user profile link(s) 325 may be split out into numerous mechanisms. In still other implementations, the user profile link(s) 325 may be a dropdown list and/or selector mechanism that may list options and/or features associated for the user account that the user may select.

The dashboard link(s) 330 typically may appear under the frontend panel(s) 305 area, as depicted in FIG. 3. Upon clicking the dashboard link(s) 330, the user may be navigated to the system frontend dashboard 300. In some implementations, the frontend dashboard 300 may act as an automatic landing and/or homepage for the user upon browsing to and/or logging into the system 105 frontend. Thus, the dashboard link(s) 330 may act as a reference point to return to for an at-a-glance view of system 105 activities and/or if the user loses his or her way while browsing the system 105.

The settings link(s) 335, the marketplace link(s) 340, and the help link(s) 345 typically may allow a user to navigate and/or select various features of the system 105 frontend interface. For example, clicking on the settings link(s) 335 may allow a user to change account-wide preferences and/or settings on system 105 frontend interface. For example, a user may set the system 105 frontend interface language, text display size, frequency of informational contact (e.g., email, text, phone, etc.) from the system 105, color schemes, etc. Clicking on the marketplace link(s) 340 may allow a user to navigate to and/or change different marketplaces set up on the system 105. For example, one marketplace may show an overview of all available tasks on the system 105, another may display all available developers looking for tasks on the system 105, and still another may display partners seeking partnership opportunities. Lastly, clicking the help link(s) 345 may allow a user to view frequently asked questions, navigate to a help forum, contact technical support for the system 105, and/or any other helpful resource associated with the system 105.

In some implementations, settings link(s) 335, the marketplace link(s) 340, and the help link(s) 345 may be depicted as in FIG. 3 (i.e., in an upper banner bar) on the system 105 frontend interface, whereas in other implementations the settings link(s) 335, the marketplace link(s) 340, and the help link(s) 345 may be generated and/or displayed in any location of the display to an end user on an end user device 120. In other implementations, the settings link(s) 335, the marketplace link(s) 340, and the help link(s) 345 may be supplemented with and/or replaced by icons. For example, the settings link(s) 335 may have an icon resembling a gear located adjacent to the settings link(s) 335, or the gear icon may act as a reference to a hyperlink that, when clicked on by a user, may navigate the user to a settings webpage. The same may be similarly done with the marketplace link(s) 340 and/or the help link(s) 345.

The dashboard widget(s) 350 typically may display capsules recent and/or frequent actions, users, and/or other relevant information. For example, the dashboard widget(s) 350 may show the latest activities, top contributors, latest followed sites, new brands, latest ideas, and/or latest public eservices posted to the system 105, to name but a few. Other examples of dashboard widget(s) 350 may include top promoters of websites, most successful websites/virtual entities, largest user bases, recent news articles relating to the system 105, system 105 announcements, and/or recent user birthdays.

In some implementations, the dashboard widget(s) 350 may be moved around to customize the frontend dashboard 300 and/or system 105 frontend interface. For example, a user may indicate-and-hold a specific widget (e.g., "Latest Activities" depicted in FIG. 3) and move that specific widget to any point on the display. This may allow the user to customize, personalize, and/or prioritize the dashboard widget(s) 350 on the frontend dashboard 300 and/or the system 105 frontend interface.

In some implementations, this moving action may result in the temporary relocation of the widget (i.e., the widget location may return to as it was before the moving action), while in other implementations, the moving action may result in a more permanent relocation of the widget (i.e., the widget location may remain as it was set after the moving action). In some other implementations, after the moving action takes place the other dashboard widget(s) 350 and/or components of the frontend dashboard 300 and/or system 105 frontend interface may remain in place on the display, whereas in other implementations the dashboard widget(s) 350 and/or components of the frontend dashboard 300 and/or system 105 frontend interface may reflow and/or move to accommodate the moving action.

In other implementations, the system 105 may populate the frontend dashboard 300 and/or the system 105 frontend interface with a group of default dashboard widget(s) 350 (e.g., those shown in FIG. 3, whereas in other implementations the system 105 may leave the dashboard widget(s) 350 field empty, and in still other implementations, the system 105 may allow the user to select from a listing of dashboard widgets (and/or create/upload their own widgets).

FIG. 4 depicts a screen shot of an implementation of the virtual entity and equity system's frontend interface displaying a frontend team application form, typically including frontend team application form(s) 400; team position selector(s) 405; team qualification input(s) 410; video URL input(s) 415; resume uploader(s) 420; resume URL input(s) 425; and application submitter(s) 430.

The frontend team application form(s) 400 typically may be used when a user applies to a website/virtual entity to assume a team role for the website/virtual entity. For example, the user may see and advertisement for an open position as a virtual entity's Chief Technology Officer (CTO) on the system 105 frontend interface, on another website, and/or off the Internet, and then the user may click on, input into an Internet browser, and/or follow a hyperlink to a frontend team application form(s) 400 for the CTO position.

In some implementations, the frontend team application form(s) 400 may be general positions (e.g., for working employees and/or developers on whatever project may be needed by the website/virtual entity), whereas other frontend team application form(s) 400 may be tailored to specific positions. After the user completes (i.e., fills out at least the frontend team application form(s) 400's required fields, if any) and submits the form, the website/virtual entity member in charge of reviewing frontend team applications may review the completed frontend team application form(s) 400.

The team position selector(s) 405 typically may provide a listing of available and/or possible positions to apply to at the website/virtual entity. For example, the list may include, but is not limited to, Content Manager, Chief Technology Officer, Marketing Manager, etc. In some implementations, the list may be queried from the system 105 to determine what roles the website/virtual entity has indicated a need to be filled, whereas in other implementations the list may be a general list of positions. In some other implementations, the listing may include a number of selectable and non-selectable list items to denote availability. For example, the list may include all possible positions on the system 105, but the team position selector(s) 405 may only enable Content Manager to be selected (e.g., because after querying the website/virtual entity's open positions, only Content Manager was retrieved).

The team qualification input(s) 410 typically may be a text input field allowing input of an explanation of the user's qualifications for the position for which he or she is applying. For example, the user may input that he or she is skilled in content management, has a degree in content management, and has worked on several other projects as a content manager. In some implementations, this field may be automatically fielded out, in whole or in part, with information from a user's account profile (e.g., programming language fluency, number of other projects worked on, etc.). In other implementations, the team qualification input(s) 410 may contain a sample response, a guided response form, and/or any other resources to guide and/or prompt the user for input(s).

In some implementations, the system 105 may screen and/or select for users based upon their submissions. For example, a user may provide his or her qualifications, as above, in the team qualification input(s) and/or any other inputs on the system 105. In some implementations, the system 105 may implement a review process for users, partners, and/or clients when creating an account on the system 105. For example, in order to be allowed to code and/or design as a user on the system 105, users may be required to submit previous work assignments for other clients, their portfolio, a mockup of what the user would design for a website portal, a letter of recommendation from a current system 105 member, a letter of interest to an administrator of the system 105, and/or any other form of testing the applicant's qualifications. This screening may serve to improve the overall skill level of users on the system 105, increase client and/or partner confidence for task completion, provide a range of diverse and skilled competitors for the game-like aspects of the system 105, etc. In some implementations, the screening process may be automated (e.g., the system 105 may review for certain key aspects such as length of response, existence of a referring user on the system 105, etc.); semi-automated (the system 105 provides some automation but system 105 administrator(s), client(s), and/or users(s) ultimately approve a new system 105 member's application); and/or user initiated (e.g., system 105 administrator(s), client(s), and/or users(s) review the application approve a new system 105 member's application, in some instances using a straight and/or weighed voting system).

The video URL input(s) 415 and the resume URL input(s) 425 typically may be text fields that may allow a user to input a URL that an individual reviewing the frontend team application form(s) 400 may view. For example, the video URL input(s) 415 may include a multimedia presentation of the user's ideas for the website/virtual entity, and the resume URL input(s) 425 may include an Internet-based resume of the user with examples of the user's development portfolio work. In some implementations, these fields may be automatically filled out based on previous input(s) to frontend team application form(s) 400 and/or the user's account.

The resume uploader(s) 420 typically may be a selector, button, and/or other mechanism to open an upload prompt. The upload prompt may, for example, allow the user to upload his or her resume from the user's local computer, a user's network, user's system 105 account, and/or other location (e.g., a user's social media account). In some implementations, this field may be automatically filled out based on previous input(s) to frontend team application form(s) 400 and/or the user's account.

The application submitter(s) 430 typically may selector, button, and/or other mechanism to mark the frontend team application form(s) 400 as complete, save the completed frontend team application form(s) 400 on the system 105, and/or notify an individual in charge of reviewing frontend team application form(s) 400 of the new completed frontend team application form(s) 400. In some implementations, selecting the application submitter(s) 430 may cause the system 105 to check that the frontend team application form(s) 400 contains sufficient input from the user (i.e., the user filled in all required fields, if any) before marking the frontend team application form(s) 400 as complete. In other implementations, the system 105 may prompt the user to provide any missing input information with a notification on the frontend team application form(s) 400 display screen (e.g., highlighting the text adjacent to the required field in an eye-catching color, placing a colored asterisk next to the required field, etc.).

Figure 5:
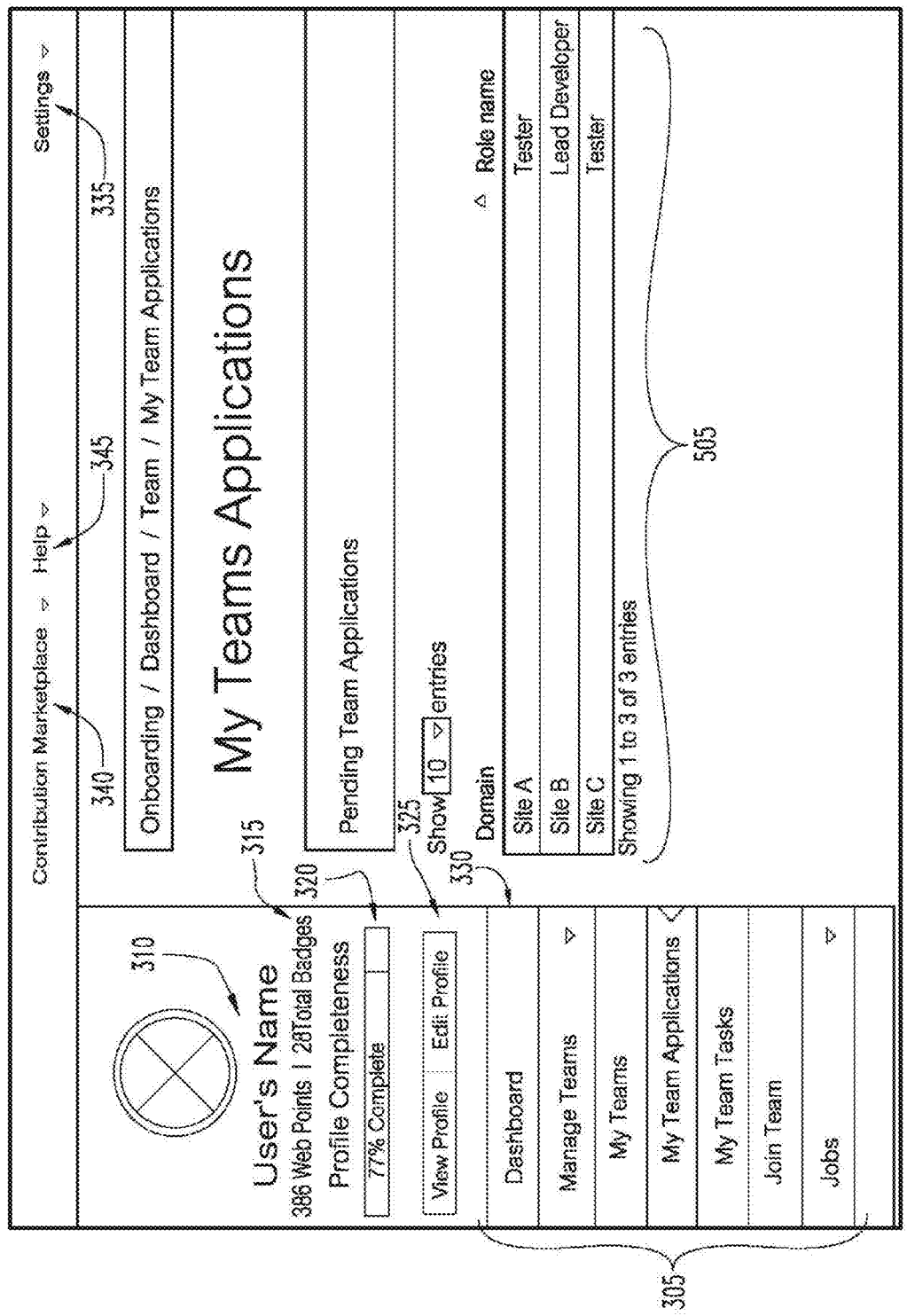
FIG. 5 depicts a screen shot of an implementation of the virtual entity and equity system's frontend interface displaying a frontend team applications webpage.

FIG. 5 depicts a screen shot of an implementation of the virtual entity and equity system's frontend interface displaying a frontend team applications webpage, typically including the frontend team applications webpage 500 and pending team applications listing(s) 505.

The frontend team applications webpage 500 typically may provide a listing of a user's pending team applications (e.g., the pending team applications listing(s) 505). The frontend team applications webpage 500 typically may appear within the system 105 frontend interface but may appear as a separate webpage, a pop-out window, and/or any other form of presentation.

The pending team applications listing(s) 505 typically may provide a detailed listing of team applications submitted by the user (e.g., after the user completes frontend team application form(s) 400). The pending team applications listing(s) 505 typically may include an itemized list of the application website/domain and/or for which role the user applied. In some implementations, the pending team applications listing(s) 505 may also list information including, but not limited to, the individual reviewing the application, whether the application has been reviewed yet, the date that the application was reviewed, feedback on the application from the system 105 and/or the individual reviewing the application, etc. In some other implementations, the individual listings may be links, which when clicked upon by a user may navigate the user to a website containing the submitted application and/or detailed information regarding the application. In other implementations, the system 105 may provide messaging capabilities between the user, the system 105, and the individual reviewing the application.

In some implementations, the pending team applications listing(s) 505 may list unfinished applications as well. For example, if the user began an application but was unable to finish the application process for some reason, the system 105 may allow the user to review that unfinished application and, in some implementations, complete and/or submit the form.

In other implementations, the pending team applications listing(s) 505 may provide suggestions of additional team applications to submit. For example, where the user has submitted seventeen applications for CTO roles for various virtual entities on the system 105, the system 105 may suggest open CTO roles for the user to apply to on the frontend team applications webpage 500.

Figure 6:
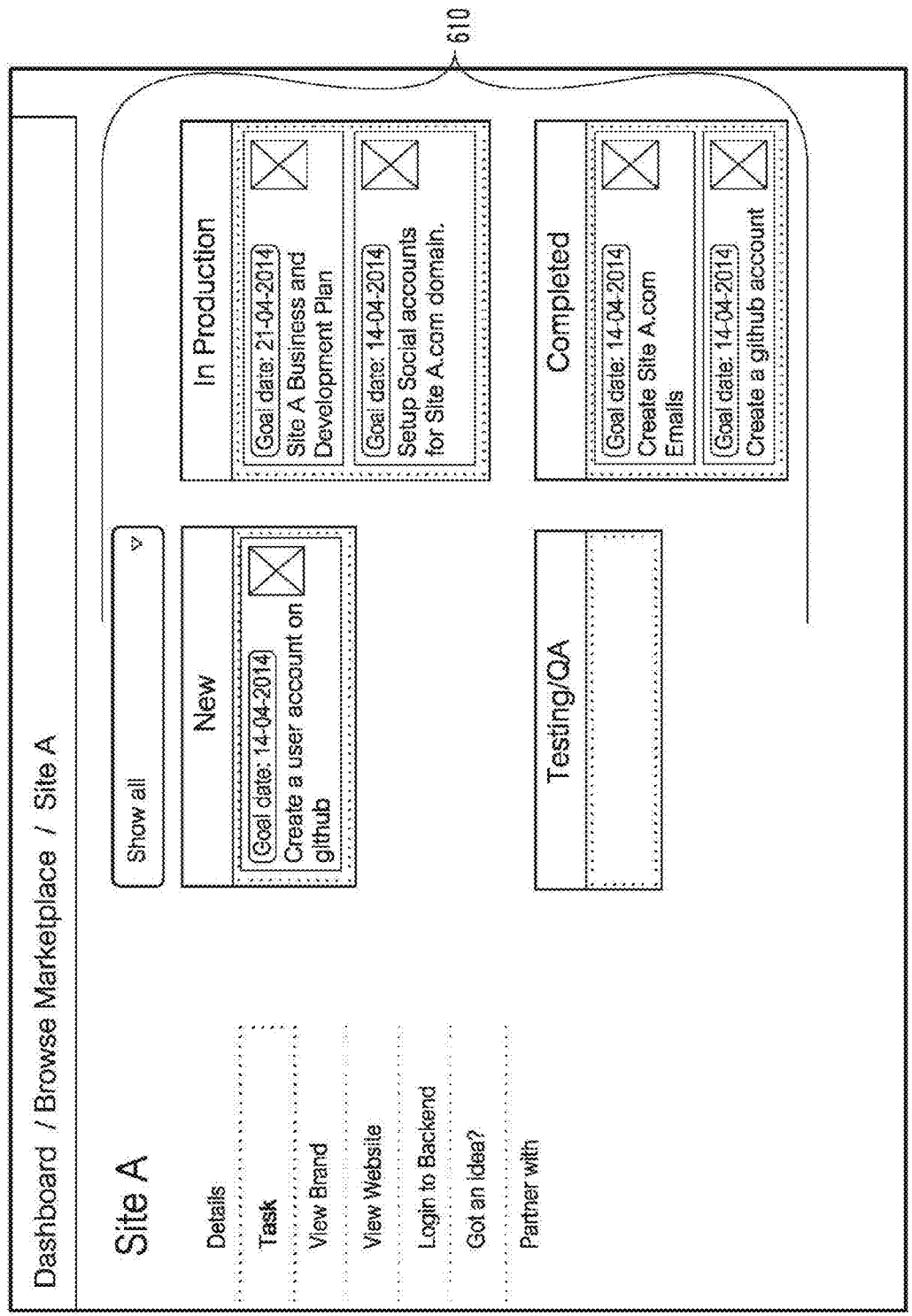
FIG. 6 depicts a screen shot of an implementation of the virtual entity and equity system's frontend interface displaying a frontend task manager.

FIG. 6 depicts a screen shot of an implementation of the virtual entity and equity system's frontend interface displaying a frontend task manager, typically including frontend task manager(s) 600 and task manager phases(s) 610.

The frontend task manager(s) 600 typically may provide an overview of tasks that may be assigned to a website/virtual entity and/or user(s). For example, as depicted in FIG. 6, there may be task manager phases(s) 610 breaking down various aspects of task creation for the website/virtual entity. The frontend task manager(s) 600 may also provide navigation of different views, details, and/or any other task-oriented aspects of the system 105 in a navigation area (as shown in the left panel). The frontend task manager(s) 600 webpage may also provide links to the system 105 backend, partnership links, and/or links to other system 105 components.

The task manager phases(s) 610 typically may provide details regarding various aspects of task creation for the website/virtual entity. For example, the task manager phases(s) 610 may detail a website/virtual entity's existing tasks and categorize them (e.g., New, In Production, Testing/QA, Completed, etc.). The task manager phases(s) 610 may give additional details such as, but not limited to, the user assigned to the task, the website/virtual entity team member assigned to supervise the task, communications regarding the task, task specifications, etc.

In some implementations, the task manager phases(s) 610 may display a small amount of details and/or the most current event that has occurred with the task. In other implementations, clicking on a task in the task manager phases(s) 610 area may expand full or partial details of the task.

In other implementations, the system 105 may automatically move the tasks in the task manager phases(s) 610 area between categories. For example, once a user has been assigned to a new task, the task may be moved to the In Production category of the task manager phases(s) 610. In other implementations, the user may move tasks between categories of the task manager phases(s) 610 manually and or semi-automatically (e.g., by running scripts periodically).

Figure 7:
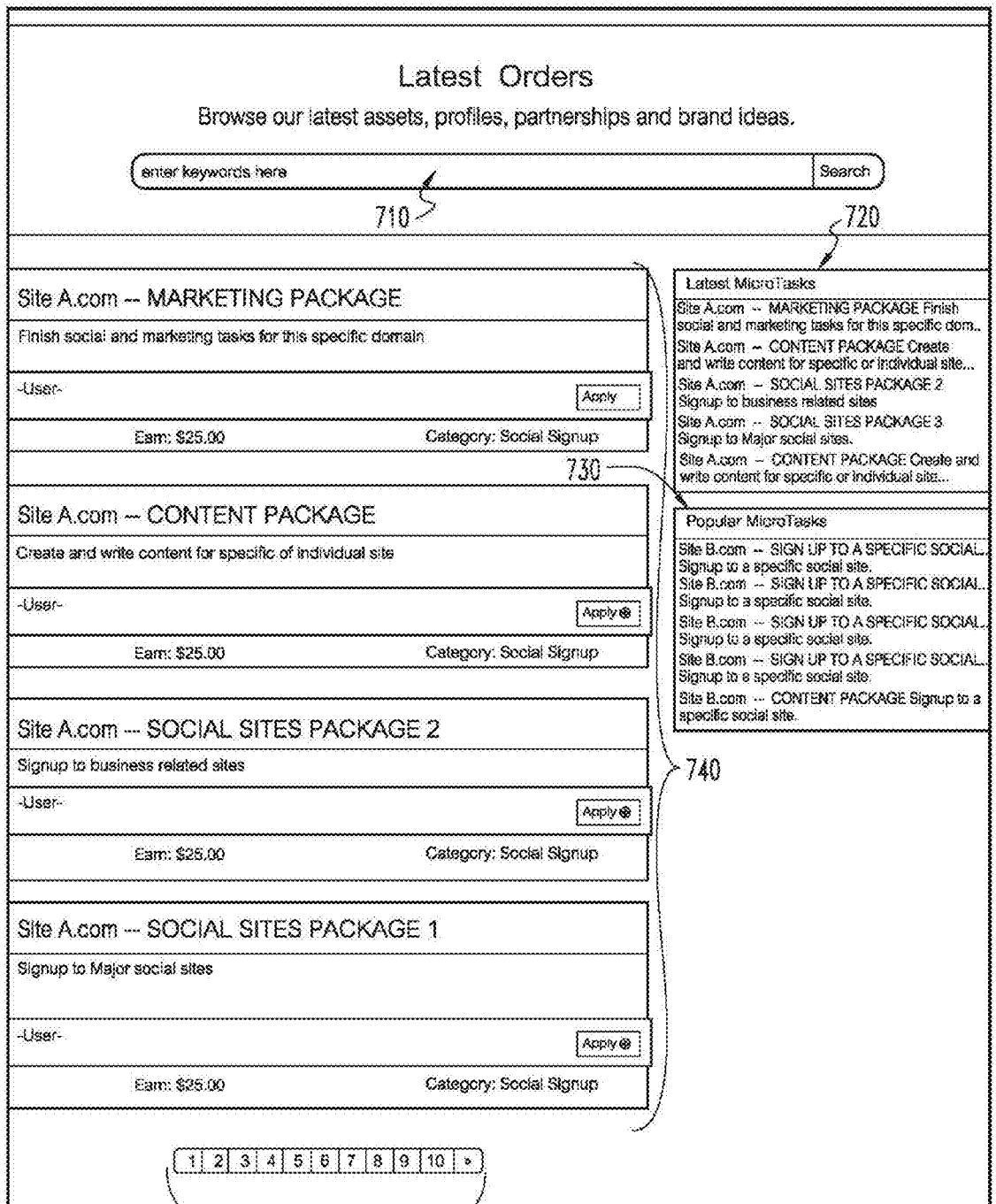
FIG. 7 depicts a screen shot of an implementation of the virtual entity and equity system's frontend interface displaying a frontend task postings webpage.

FIG. 7 depicts a screen shot of an implementation of the virtual entity and equity system's frontend interface displaying a frontend task postings webpage, typically including the frontend task postings webpage 700; postings search field(s) 710; latest task listing(s) 720; popular task listing(s) 730; task postings detail(s) 740; and task posting page selector(s) 750.

The frontend task postings webpage 700 typically may provide a listing of tasks, assets, profiles, partnerships, ideas, and/or other aspects posted to the system 105. In some implementations, the frontend task postings webpage 700 may display all of the above listings, whereas in other implementations the frontend task postings webpage 700 may display only a subset of the above listings (e.g., only tasks). Through the frontend task postings webpage 700, users may, but are not limited to, browse for task to complete, virtual entities to create and/or grow, users to contact for help, etc.

The postings search field(s) 710 typically may provide an input area for a user to search the frontend task postings webpage 700 for postings. For example, an individual searching for tasks requiring the user to write a mission statement may input "mission," "mission statement," and/or "statement" to attempt to find relevant postings. In some implementations, the posting search field(s) 710 may include filters for searching the frontend task postings webpage 700 including, but not limited to, date ranges, website/virtual entity names, geographic market, growth rate, number of users, number of tasks completed, compensation rate, compensation type, etc.

The latest task listing(s) 720 typically may list a subset of the postings on the system 105 based on the most chronologically recent tasks posted to the system 105. The latest task listing(s) 720 field may, for example but not limited to, display the associated website/virtual entity, the type of task, and/or a brief description. In some implementations, the latest task listing(s) 720 may list something other than tasks. For example, the field may list latest partnerships, latest profiles, latest completed tasks, etc.

The popular task listing(s) 730 typically may list a subset of the postings on the system 105 based on the most popular tasks posted to the system 105. Popularity may be determined based on a number of factors, including but not limited to, number of clicks on the task from the frontend task postings webpage 700, number of applications submitted for the task, etc. The popular task listing(s) 730 field may, for example but not limited to, display the associated website/virtual entity, the type of task, and/or a brief description. In some implementations, the popular task listing(s) 730 may list something other than tasks. For example, the field may list popular partnerships, popular users, popular websites/virtual entities, etc.

The task postings detail(s) 740 typically may list a subset of the postings on the system 105 with a relatively (compared to the latest task listing(s) 720 and the popular task listing(s) 730) detailed description of tasks. For example, the task postings detail(s) 740 may list, but is not limited to, the associated website/virtual entity, the name of the task, a detailed description of the task requirements, temporal restraints on the task's completion, the supervising user associated with the website/virtual entity, the compensation type, the compensation amount, the category of work, when the task was posted, etc.

The task posting page selector(s) 750 typically may allow the user to browse between pages of postings on the frontend task postings webpage 700 where the frontend task postings webpage 700 returns a greater number of postings than may be displayed in the task postings detail(s) 740 area. For example, if the task postings detail(s) 740 may only display ten tasks in the given space, then the task posting page selector(s) 750 may add additional pages of listings for the task postings detail(s) 740 area. In some implementations, the system 105 may provide the user with a mechanism for specifying the number of postings to be displayed in the task postings detail(s) 740 area. For example, the system 105 may provide a selector in the user's account settings (e.g., accessible through the settings link(s) 335), a dropdown on the frontend task postings webpage 700, and/or any other mechanism for specifying the number of items to be displayed to a user.

FIG. 8 depicts a screen shot of an implementation of the virtual entity and equity system's frontend interface displaying a frontend eservice requests webpage, typically including the frontend eservice requests webpage 800; user eservice selection(s) 810; and eservice request details listing(s) 820.

The frontend eservice requests webpage 800 typically may display service requests on the system 105, typically associated with a user.

The user eservice selection(s) 810 typically may allow a user to select various aspects of the electronic services feature-set. For example, a user may review his or her electronic service applications (pending and/or complete), view only his or her approved electronic service applications, and/or withdraw from electronic services and/or electronic service applications. Clicking on a user eservice selection 810 may then navigate the user to a corresponding webpage and/or listing of relevant electronic service applications.

The eservice request details listing(s) 820 typically may provide a user with a detailed listing of a various aspect of the electronic service feature-set. For example, as depicted in FIG. 8, the eservice request details listing(s) 820 may display the user's existing electronic service requests, the title of the electronic service request, the date the electronic service application was submitted, the status of the electronic service application, and actions to be taken on the electronic service application. In some implementations, actions may be, but are not limited to, cancelling and/or withdrawing from an electronic service application, amending the electronic service application, and/or any other any other relevant action.

Figure 9:
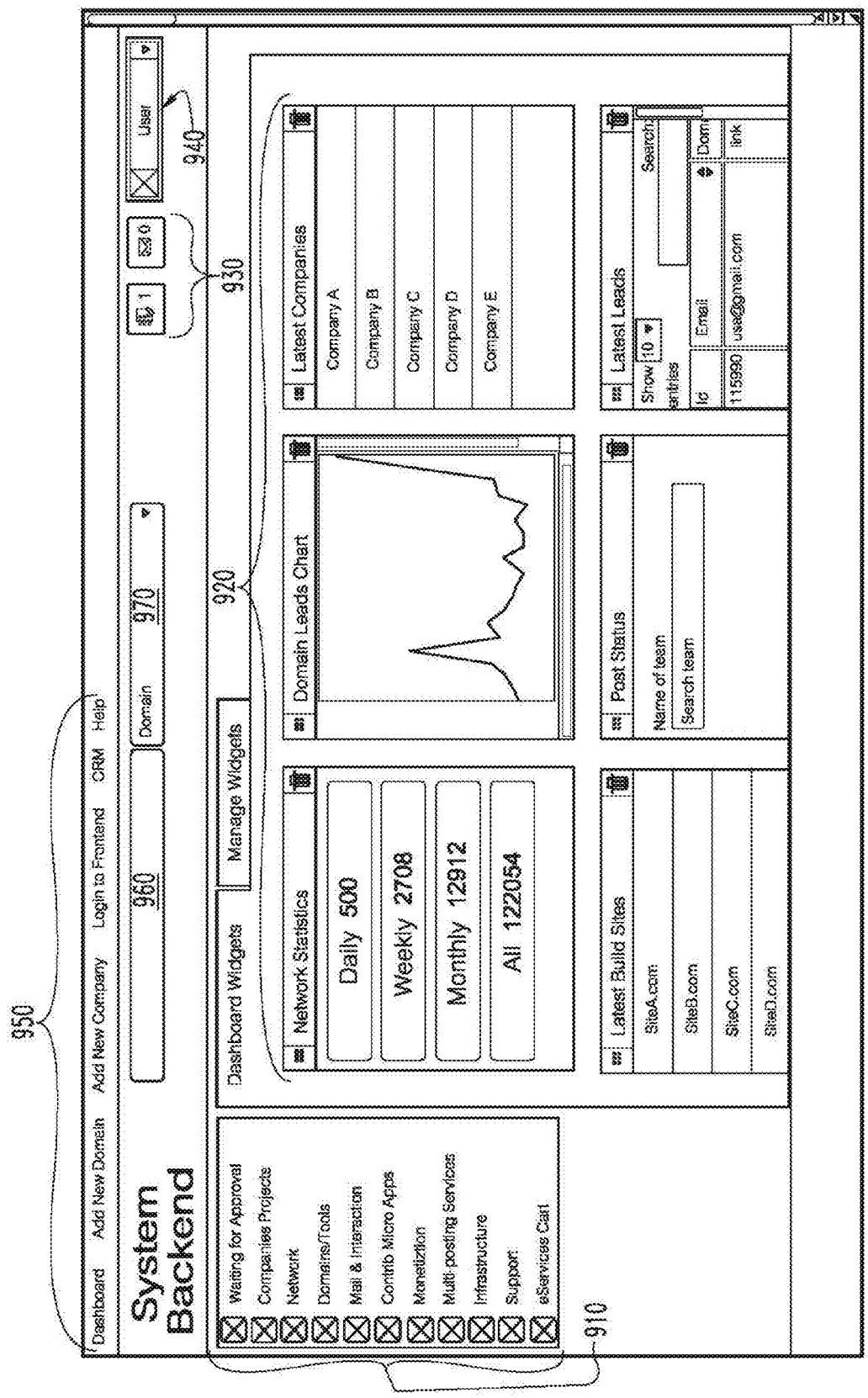
FIG. 9 depicts a screen shot of an implementation of the virtual entity and equity system's backend interface displaying a backend dashboard.

FIG. 9 depicts a screen shot of an implementation of the virtual entity and equity system's backend interface displaying a backend dashboard, typically including the backend dashboard(s) 900; backend dashboard component listing(s) 910; backend dashboard widget(s) 920; backend user notification(s) 930; backend user identifier(s) 940; backend quick link(s) 950; backend search field(s) 960; and backend search filter selector(s) 970.

The backend dashboard(s) 900 typically may provide a client with an interface to manage, create, monetize, modify, expand, sell, and/or otherwise run the client's domain(s).

For example, a client may log into the system 105 backend and use the backend dashboard(s) 900 to add a new domain that the client may use as the basis for a new virtual entity or vice versa. The client may also review statistics and analytics associated with the client's website(s) and/or virtual entities. In some implementations, backend dashboard(s) 900 may act as an automatic landing and/or homepage for the client upon browsing to and/or logging into the system 105 backend. Thus, the backend dashboard(s) 900 may act as a reference point to return to for an at-a-glance view of system 105 activities and/or if the client loses his or her way while browsing the system 105 backend.

The backend dashboard component listing(s) 910 typically may act in a similar fashion to the frontend panel(s) 305 in FIG. 3 and discussed elsewhere in this disclosure. For example, the backend dashboard component listing(s) 910 may display navigational links (with or without icons), dynamically generate the content of the backend dashboard component listing(s) 910 respective of the content being displayed to the client from the system 105 backend, be presented to the user in the form of a selector mechanism, and/or not be displayed at all (and/or presented upon a client's interaction with the system 105 dashboard.

The backend dashboard widget(s) 920 typically may be presented similar to the dashboard widget(s) 350 of FIG. 3 and described elsewhere in this disclosure. For example, they typically may display capsulized information such as network statistics, domain leads, graphical representation(s) of statistics and/or analytics, most recently created virtual entities, etc. In some implementations, the backend dashboard widget(s) 920 may be moved around to customize the location of the backend dashboard widget(s) 920; and in other implementations the client may add, remove, and/or customize the backend dashboard widget(s) 920 that are displayed on the backend dashboard(s) 900.

The backend user notification(s) 930 typically may provide notifications to a client of the system 105 backend. Notifications may include, but are not limited to, upcoming task deadlines, messages from team and/or system 105 members, updates to the system 105, offers for partnerships, etc. The client typically may then click on a respective backend user notification 930 and see notifications associated with that backend user notification 930.

In some implementations, the backend user notification(s) 930 may be an icon with an adjacent number that indicates the number of new notifications, whereas in other implementations the backend user notification(s) 930 may be simply an icon that appears when any new notification appears, a single backend user notification 930 for every notification, an auditory alarm upon the client's logging into the system 105 backend, and/or any other form of notifying a client on the system 105 backend.

The backend user identifier(s) 940 typically may act similarly to the user identifier(s) 310 of FIG. 3 and described elsewhere in this disclosure. For example, typically may be a system user's real-world name, an alias, and/or some other form of identifying a user on the system 105. For example, the backend user identifier(s) 940 display the client's real name, the client's alias, and/or any other form of client identification. The backend user identifier(s) 940 may be unique for the system 105, may repeat on the system 105 across clients, and/or may be made unique by adding a unique distinguishing element (e.g., appending "_[systemID]" to the end of the client name where [systemID] may correspond to a value stored in a system 105 database (e.g., the system database 180)).

Similarly, in some implementations, the backend user identifier(s) 940 additional user identifier(s) may be included in addition to, or in the place of, the user's name and/or alias as described above. For example, an image, icon, or other text and/or graphic may represent the user as the backend user identifier(s) 940. This may use, for example, text, a placeholder, a graphic, and/or any other populatable backend user identifier 940.

The backend quick link(s) 950 typically may act similar to the settings link(s) 335, the marketplace link(s) 340, and the help link(s) 345 as described elsewhere this disclosure and depicted in FIG. 3. For example, clicking on a backend quick link(s) 950 may navigate the client to an associated component of the system 105. These components may be, for example but not limited to, the backend dashboard(s) 900, an interface to add and/or remove a domain, an interface to add and/or remove a virtual entity, a link to navigate to the system 105 frontend, an interface for a customer relationship management (CRM), and/or help topics.

While the backend quick link(s) 950 may be located at the top of the system 105 backend interface as depicted in FIG. 9, in some implementations the backend quick link(s) 950 may be located anywhere on the system 105 backend interface (e.g., the backend dashboard(s) 900). In other implementations, the backend quick link(s) 950 may not be displayed to the client until the client performs a gesture and/or interacts with the system 105 to trigger system 105 backend interface to display the backend quick link(s) 950.

The backend search field(s) 960 typically may act similar to the postings search field(s) 710 depicted in FIG. 7 and described elsewhere in this disclosure. The backend search field(s) 960 typically may provide an input area for a user to search the system 105 for data on the system 105 backend associated with the client. For example, a client may input "College" into the backend search field(s) 960 to retrieve and display all pieces of the client's data associated with the search term "College." The client's data associated with the search term may be domains including the term, virtual entities including the term, documents stored on the system 105 associated with the domains and/or virtual entities including the term, etc.

In some implementations, the backend search field(s) 960 may include filters for searches including, but not limited to, date ranges, website/virtual entity names, geographic market, growth rate, number of users, number of tasks completed, compensation rate, compensation type, etc.

The backend search filter selector(s) 970 typically may be a dropdown selector and act to filter search results provided to the client after the client searches using the backend search field(s) 960. For example, a client may select "Domain" from the backend search filter selector(s) 970 to only search for domains associated with the client including the term "College." Other implementations may allow the client to further filter searches by selecting multiple backend search filter selector(s) 970.

In some implementations, providing input(s) to the backend search field(s) 960 and/or the backend search filter selector(s) 970 may cause the information displayed in the system 105 backend interface (e.g., the backend dashboard(s) to change to reflect the input(s)). For example, if the client input "CollegeAthletics" into the backend search field(s) 960 and then selected the client's website "MyCollegeAthletics.com" from displayed results, the backend dashboard widgets 920 may refresh and/or change to display information relevant to the client's "MyCollegeAthletics.com" website/virtual entity.

FIGS. 10-14 illustrate process flows for some embodiments of the present novel technology (e.g., an embodiment of FIG. 1). With regard to FIGS. 10-14, FIG. 10 describes a typical, overall process flow and FIGS. 11-14 describe subparts of the FIG. 10 process flow.

Figure 10:
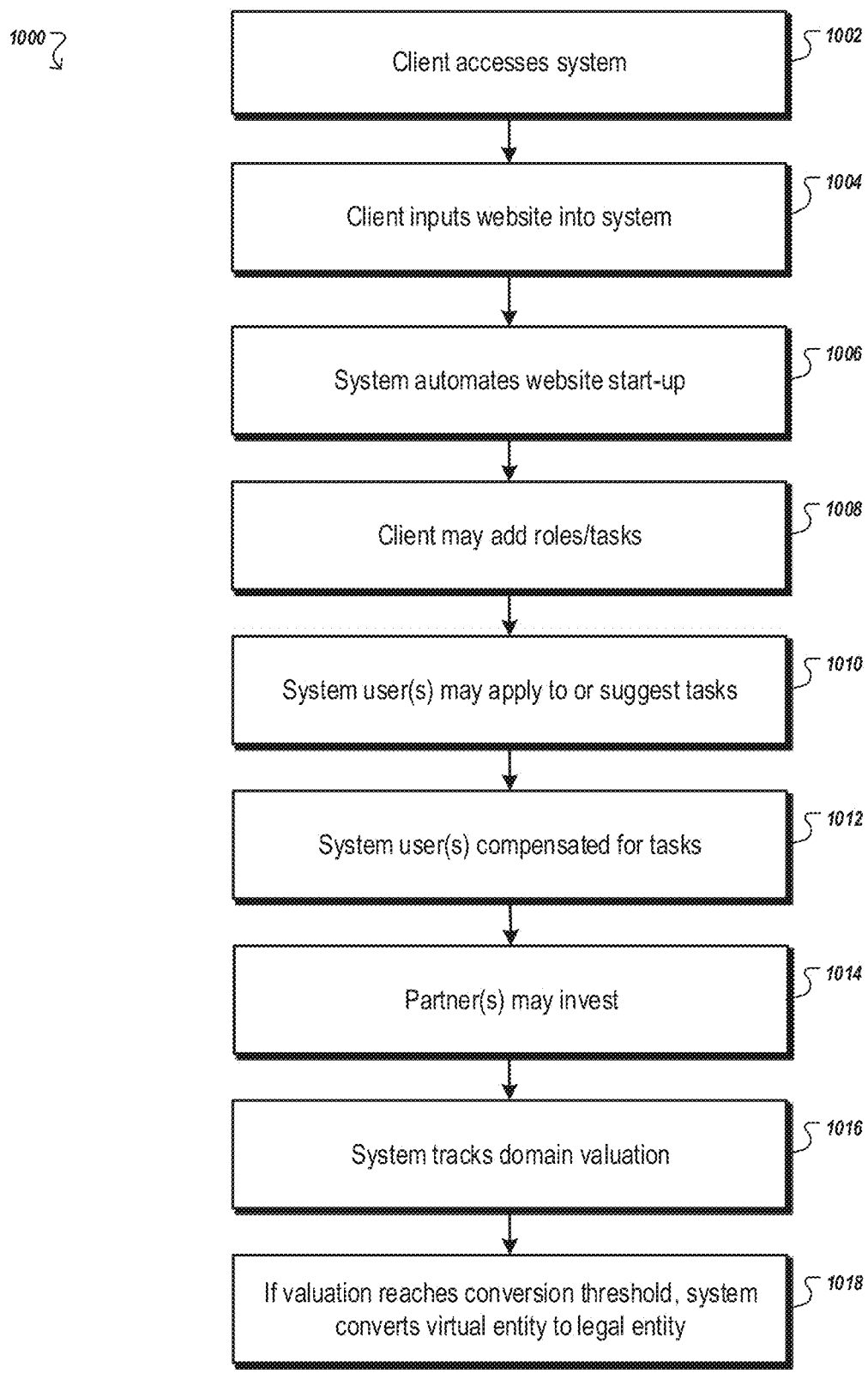
FIG. 10 is a process flow chart associated with an implementation of the virtual entity and equity system.

FIG. 10 describes one overall process flow associated with an implementation of the virtual entity and equity system 105, typically including the steps of "Overview process" 1000; "Client accesses system" 1002; "Client inputs website into system" 1004; "System automates website start-up" 1006; "Client may add roles" 1008; "System user(s) may apply to or suggest tasks" 1010; "System user(s) compensated for tasks" 1012; "Partner(s) may invest" 1014; "System tracks domain valuation" 1016; and "If valuation reaches conversion threshold, system converts virtual entity to legal entity" 1018. In some instances, these steps may be repeated several times in sequential order, steps may be cyclically performed to reach a threshold, and/or one or more steps may be omitted.

The "Client accesses system" 1002 step typically may be performed by a client of the system 105. The client typically may access the system 105 through an end user device 120 with an Internet browser or a client-side software application that may access the system 105. For example, the client may browse to www.virtualentityequitysystem.com and the system 105 may present the client with the system 105 frontend, the system 105 backend, and/or a login prompt for authentication purposes. In other implementations, a client-side software application may allow a client to manually or automatically authenticate with the system 105 through an application and/or module installed, in whole or in part, on the client's system.

The "Client inputs website into system" 1004 step typically may be performed by the client. Typically, the client may access the system 105 as described above and then input a domain name and/or other representation of a virtual entity website. For example, the system 105 may provide a wizard utility and/or prompt to guide a client through the website input process to the system 105. In other implementations, the system 105 may simply have an input field (e.g., similar to the backend search field(s) 960 of FIG. 9) that a client may input a domain into. In some other implementations, the client may also use a client-side application to input—manually, through a guided process, and/or through automation (e.g., a scripted instance)—the website into the system 105.

In some implementations, the client may also make other selections when inputting the website into the system 105. For example, some implementations may provide templates and/or preset schema from which to generate the website. For example, the system 105, the client, and/or a client-side application may provide a blog template that integrates various social computing components and simple mechanisms to add content to the blog. Other templates may include, but are not limited to, a mobile transactions portal, a crowdfunding portal, a marketing portal, and/or a gaming portal. Thus, depending on the client's selection of a template or schema, the system 105 may automate the aesthetics and/or functionality of the new website with little to no additional client input.

The "System automates website start-up" 1006 step typically may be performed by the system 105 after the client inputs the website into the system 105 as described above. Typically, the system 105 may use a selected template, as described above, to generate a website portal. In some implementations, the system 105 may also integrate various extensions or personalization aspects into the template. For example, the system 105 may automate the generation and linking of a number of social media icons and hyperlinks to reference the client's social media profiles. In other implementations, the system 105 may generate or place a client-supplied logo onto the page. Thus, the typical tasks associated with personalizing a template to reference the client may be completed automatically and/or manually by the system 105, saving the client time and providing consistency.

Further implementations may provide features used by the system 105 to enhance and/or calculate the website's estimated value. For example, the system 105 may automatically enable and/or configure features such as, but not limited to, referrals and referral management, capitalization (cap) table management, social media identifiers, visitor traffic figures, user interaction metrics, etc. These features may be bundled into webpage code (e.g., module embedded therein), extensions called from the webpage code (e.g., modules called by reference therein), applications cooperating with the website (e.g., monitoring the operations of the web server and providing support and/or recordation), etc.

In some implementations, the system 105 may detect, measure, identify, and/or query data stored on the system 105 to the system 105. For example, the system 105 may record all incoming end-user traffic to the website, the number of clickthrough conversions per visitor, the aggregate advertising income for the website from Internet traffic, the number and frequency of repeat visitors, the number and frequency of discrete viewers, the average time a visitor spends on the website and/or specific webpages, the activity per end-user on the website, the origination points of visitors (e.g., using a PHP and/or other tracking mechanism, such as "index.php?source=source.com"), etc. The system 105 may store this data in a data store connected to the system 105 (e.g., the system database 180), a data store connected to the system 105 via a network link, and/or remote to the system 105 (e.g., located on another server, system, and/or any other data store). The system 105 may perform calculations on the stored system 105 data upon storing the information (i.e., on-the-fly processing), at a later date (e.g., nightly, weekly, monthly, manually as the system 105 and/or administrator defines, etc.), and/or upon the need for such calculated data (e.g., when the system 105 requests the average length of time for user visits, the data store and/or the server housing/connecting to the data store may divide the aggregate visitor time on the website by the total number of visitors to the website, etc.). In some implementations, the system 105 may perform analytical functions on the stored data to predict trends from the stored data.

In yet other implementations, the system 105 may measure and/and track referrals of users, clients, and/or partners to the system 105 by other system 105 users, clients, and/or partners. Tracking of referrals may be performed, for example, through using a PHP and/or other tracking mechanism, such as "index.php?source=source.com"; using referral codes entered by an individual upon creating an account with the system 105, by using an unique referral link, etc. In some implementations, compensation (tangible and/or intangible) may be awarded to those who refer individuals to the system. In some other implementations, referral volume, referral rates, referee and/or referee demographics, and/or the like may be used to calculate, in whole or in part, a valuation of an entity.

In other implementations—the system 105 may detect, measure, identify, and/or query data external to the system 105 (e.g., stored and/or computed on intermediary servers, third-party data sources (e.g., Internet traffic figures, consumer satisfaction ratings, investor ratings, etc.), external valuation sources (e.g., expert and/or amateur valuations), etc.). For example, the system 105 may measure and/or or normalize traffic patterns based on Internet traffic retrieved from an external, third-party source that provides Internet traffic metrics. In another example, the system 105 may identify one or more sources of objective and/or subjective assessment(s) for website valuation from external sources and retrieve and/or normalize these assessment(s) to derive a metric for assessor evaluation of the website (i.e., does the assessor like the website, recommend others to view/use the website, invest in the virtual entity, etc.). In yet another example, the system 105 may access, retrieve, and/or receive data from external sources detailing the amount of advertisement revenue generated directly and/or indirectly through the website (e.g., through tracking cookies, common login authentication (e.g., using a universal social media account login that authenticates on websites) etc.). In still another example, external data sources may query, retrieve, and store reviews of the website from other end users, websites, and/or services (e.g., YELP (YELP is a registered trademark of Yelp Inc., a Delaware corporation, located at 140 New Montgomery, 9th Floor, San Francisco, Calif. 94105), GOOGLE+ (GOOGLE+ is a registered trademark of Google Inc., a Delaware corporation, located at 1600 Amphitheatre Parkway, Mountain View, Calif. 94043), AMAZON (AMAZON is a registered trademark of Amazon Technologies, Inc., a Nevada corporation, located at P.O. Box 8102, Reno, Nev. 89507), SITEJABBER (SITEJABBER is a registered trademark of GGL Projects, Inc., a California corporation, located at 1206 Sargent Drive, Sunnyvale, Calif. 94087), CONSUMER REPORTS (CONSUMER REPORTS is a registered trademark of Consumers Union of United States, Inc., a New York non-profit corporation, located at 101 Truman Avenue, Yonkers, N.Y. 10703), etc.).

In yet other implementations, the system 105 may detect, track, store, query, and/or otherwise manage data associated to user contributions on the system 105 and/or the manner and/or extent of these contributions on the system 105 and/or system assets. For example, the system 105 may track the number of times a user contributes to the system 105; the type of contributions a user makes to the system 105; the amount of time a user spends on the system 105; the efficiency of a user's contributions (e.g., how long does it take for the user to deliver a satisfactorily completed task to a client); the amount of applications made by a user; the number of tasks posted by clients; the frequency of task posting by clients; the number of team members compared to the value of a virtual entity; the activity of team members compared to the value of a virtual entity; the experience of team members compared to the value of a virtual entity; etc. The system 105 may also detect, track, store, query, calculate, and/or otherwise manage data associated to users, clients, and/or virtual entity valuation to measure the effect and/or effectiveness of a user and/or client's actions on the system 105. For example, a highly successful user that designs interfaces, logos, etc. may be noticeable due to an increase in a virtual entity's valuation following a significantly different upward trend after the user completes a design task for that virtual entity. Conversely, a typical user's effect may have moderate effect on the valuation of a virtual entity, and an ineffective user may tend to show a negligible and/or negative effect on a virtual entity's valuations. In other implementations, such effectiveness might otherwise be measured in relation to partner interest/investment, user activity, Internet traffic volume, Internet traffic character (e.g., length of visits, frequency of visits, etc.), etc.

In further implementations, the system 105 may, for example, store and/or query data associated with these features to enable the system 105 to estimate, in whole or in part, a valuation figure for the website. Thus, the system 105 may factor the number of referrals, the activity of users, the total clickthrough impressions, and the number of unique visitors to a website in order to arrive at the conclusion that the website domain typically may sell for approximately $50,000.

In some other implementations, the system 105 may place advertisement features onto the website and/or attempt to fill initial roles in the new virtual entity (formed around the website) such as chief executive officer (CEO), chief technology officer (CTO), marketing officer, etc. In some implementations, the system 105 may automatically define that the CEO of the new virtual entity may be the client who created the entity. In some other implementations, the system 105 may select an individual or a group of individuals that it believes match the necessary characteristics for the position. In some further implementations, matching of users to a position may be done by an employee or contractor of the system 105, whereas in other implementations the matching may be automated or semi-automated. For example, users (such as developers) may upload a resume to the system 105, which is then parsed and queried by the system 105 to match qualifications to the position. In another example, users' previously completed tasks on the system 105 for virtual entities, along with reviews of the users, may factor into the matching process. Further, in some implementations, the system 105 may automatically assign users that match the position (e.g., by weighing the user's previous recommendations and resume contents) or the system 105 may select a group of individuals and allow the client to make the final determination(s).

The advertisement features may also be used together with or separately from statistical and analytical analysis tools to track and/or predict trends of activity on the website and/or on the system 105. For example, the system 105 and/or the client may receive and record information to a database identifying end users who visit the client's created website (e.g., elements such as date, time, end user's IP address (Internet Protocol version 4 (IPv4), Internet Protocol version 6 (IPv6), etc.), browser fingerprint (e.g., browser serial number, browser ID file, browser type, browser version, time zone, screen size, color depth, local code indicators, etc.), end user's geographic location (e.g., where end user allows location services on desktop or mobile device), etc.). After recording this information, the system 105 and/or the client may analyze the stored data for trends using analytics. For example, analytics may predict, but is not limited to, that the registered user base of a website may increase or decrease exponentially, that end users are primarily from the United Kingdom and Canada, and/or end users tend to visit the website once a week at most. Collected and predictive data such as these may allow clients and/or the system 105 to better populate content, advertise, promote, or improve the website.

Figure 11:
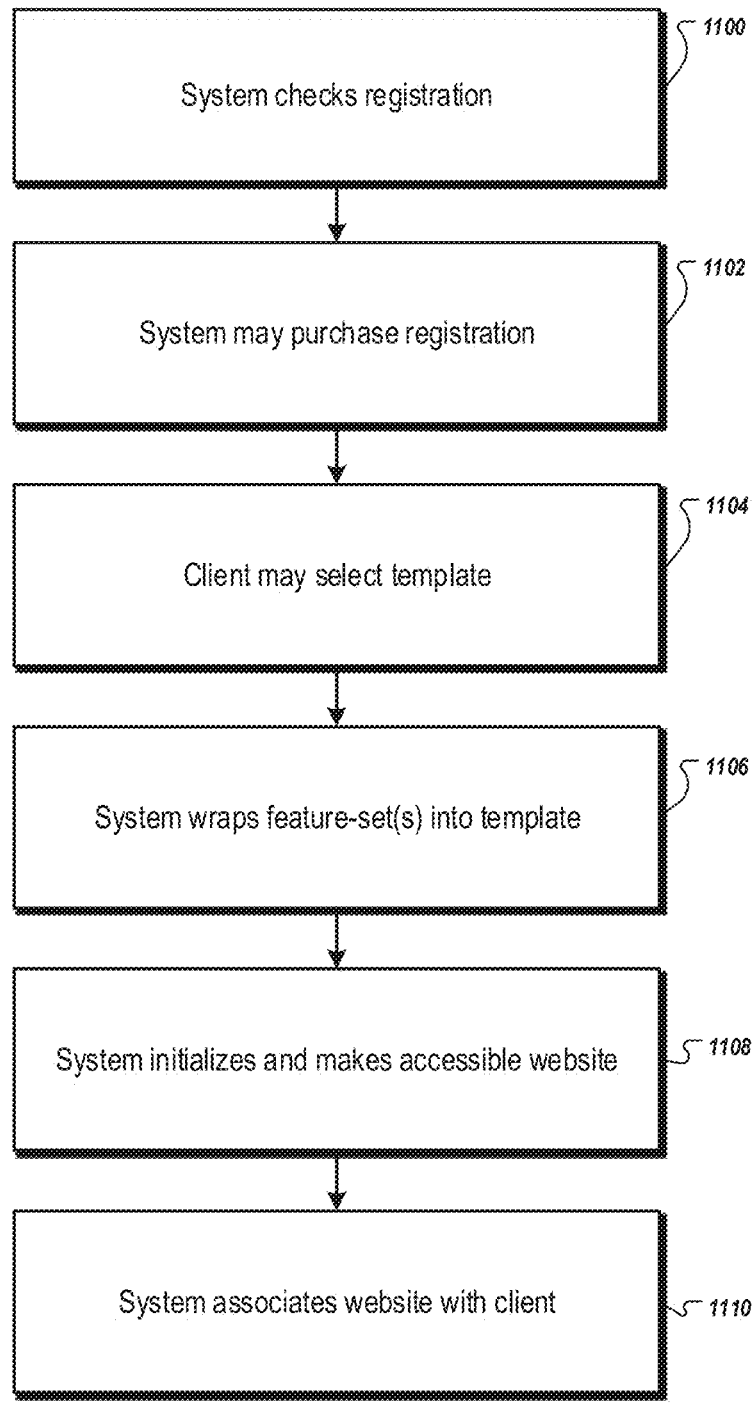
FIG. 11 is a process flow chart of a subpart of the process of FIG. 10 illustrating automation of website start-up by the system.

The "System automates website start-up" 1006 step is explained in greater detail with relation to FIG. 11 and the associated portions of this disclosure hereafter.

The "Client may add roles" 1008 step typically may be performed by the client through the system 105 (frontend and/or backend). While the system 105 may define default roles such as the CEO, CTO, etc. (e.g., based on a global preset and/or a template), or in some implementations the client may have a client-defined set of roles to define for the website, the client may also define additional roles for the virtual entity as the client sees fit. For example, while the defaults may only define the client as a CEO, but the client may additionally define his or her business partner as the CEO and/or the CTO. In some implementations, the system 105 may predict and suggest additional roles for the client to add based on previous roles defined by the client and/or other system 105 clients. For example, if the client is creating a blog website, and a subset of previous users tends to define a chief blogger role, the client may be suggested to create the chief blogger role as well. In some other implementations, the system 105 may also suggest users to fill the roles as described above.

The "System user(s) may apply to or suggest tasks" 1010 step typically may be performed by end users of the system, such as developers, marketers, or any other worker on the system 105. While the system 105 may define certain tasks for newly created websites automatically and/or semi-automatically, a client and/or a system user may wish to do other tasks beyond the default tasks. For example, the default task set may define a task to create a virtual entity description to put on the website's About Us webpage, but the client may also wish to have an overview of the virtual entity's services and a price breakdown created and placed on the website as well. Thus, the client may define that second task on the system 105 and users may apply to complete that task.

In some implementations, and depending on the client's desires, the requirements for successfully completing the task may be defined by the client and/or negotiated between the client and user. For example, the client may define that the task requires a minimum and/or maximum word count, and the user may negotiate to modify the word count. In some other implementations, the default tasks may be generated based on a system-wide set of tasks, a client-defined set of tasks, and/or a template-defined set of tasks (to name only a few). These task sets may, in some instances, be the same, and in other instances the task sets may be differ minutely or greatly. Further, in some implementations, the task sets may combine in whole or in part with other task sets to create an aggregate task list to be generated for the virtual entity and website.

The "System user(s) compensated for tasks" 1012 step typically may be performed by end users of the system 105. Typically, end users may be compensated based on completion of a task sufficient to fulfill the guidelines set by the client. For example, if the end user accepted a task to write marketing material and design a logo for the virtual entity and website, and the end user did exactly this, then the end user may be compensated for his or her services in completing the task.

Typically, compensation may be in the form of equity in the virtual entity. For example, if the end user agrees to complete a task for 1% equity in the virtual entity (should the virtual entity ever convert to a real-world equity share situation), then the end user may be compensated with 1% of the total equity in the virtual entity, and the system 105 may record this compensation and associate it with the end user. In some implementations, the value compensated to the end user may be derived from the time spent on the task and then converted to equity in the virtual entity. For example, if the end user spends 100 hours on a task, at a working rate of $20/hour, then the end user contributed approximately $2000 worth of work to the virtual entity. Accordingly, if the system 105 ascribes an estimated value of $20,000 to the virtual entity, the end user's work may account for approximately 10% of the equity in the virtual entity. In other implementations, the system 105 may assign compensation based on alternative measurements, such as a time-sensitive compensation structure (i.e., early developers may receive greater compensation than later developers) or a remainder-sensitive compensation structure (i.e., end users may be compensated for a percentage of the remaining, outstanding equity in the virtual entity instead of the entirety of equity in the virtual entity).

In some further implementations, the present and/or historical allocation of equity in the virtual entity may be viewable though the frontend and/or backend of the system 105 and may, in some other implementations, allow a viewer to break down who is associated with what equity values and for what task or role the user was compensated with that equity. For example, the entire equity of the virtual entity may be represented by a pie-type chart, wherein each section of the pie-type chart represents a separate equity holder, and wherein mousing over a section displays a breakdown of the tasks and/or roles that resulted in the equity holder's allocation of equity.

In other implementations, allocation of equity may follow a fixed equity split (FES) type format, whereas in some implementation the allocation of equity may follow a dynamic equity split (DES) type format. In the case of FES, equity may typically be divided at the beginning of an entity's creation and acts largely as an estimate of the entity's future and the needs of that future entity. For example, an entity may be establish so that the system 105 client simply receives 100% of the entity's equity. Alternatively, the FES entity may be structured so that the owner receives 50% equity in the entity and the first five investors each get 10% equity. Potential downfalls of FES may be that individuals hold equal equity may not equally contribute and/or that splitting of equity after this initial estimation may involve renegotiation of the establishing agreements. DES may be beneficial to relieve some of FES's issues by dynamically assigning equity based upon the contributions of equity holders. For example, if a virtual entity were to vest 1% equity for fifty weeks (vesting 50% in total) to contributors to the virtual entity, that 1% may be divided proportionally to contributors based on each contributor's relative contribution. For example, if one coder input one thousand lines of code, while a similar coder input two thousand lines of code, the second coder may receive twice as much equity from the 1% block of equity (i.e., if only the two coders contributed during a week, the first coder may receive ⅓% equity in the entity while the second coder may receive ⅔% equity). In another example, contributors' contributions may be weighed based on the skill and/or position of the contributor. For example, if the above-described first coder was twice as skilled as the second coder, both coders may receive equal equity compensation because the first coder's doubled experience weighs against the second coder's doubled lines of code. In some other implementations, an entity may use a hybrid split scheme (combining aspects of FES and DES. For example, an entity's creator may take 50% equity in the entity following an FES format, while the remaining 50% is distributed to contributors according to a DES format.

In some implementations, compensation may be in a form other than equity in the virtual entity. For example, a user may complete a task and be compensated in currency (e.g., United States dollars (USD), Japanese yen, etc.). The currency-based compensation may, in some instances, may be derived from an equivalent percentage of equity compensation structure. For example, if the task may compensate the end user with 1% of the virtual entity, and the system 105 estimates the value of the virtual entity at $100,000, then the end user may be compensated with $1000 ($100,000*1%). In still other instances, the currency-based compensation may simply be a flat rate. For example, for completing a task and end user may be compensated with $200 USD. In some other implementations, compensation may be transferred in a barter-like transaction. For example, a user may barter with the client to exchange a certain quantity of services (e.g., legal work) and/or goods (digital and/or physical) for a certain percentage of equity in the virtual entity.

Figure 12:
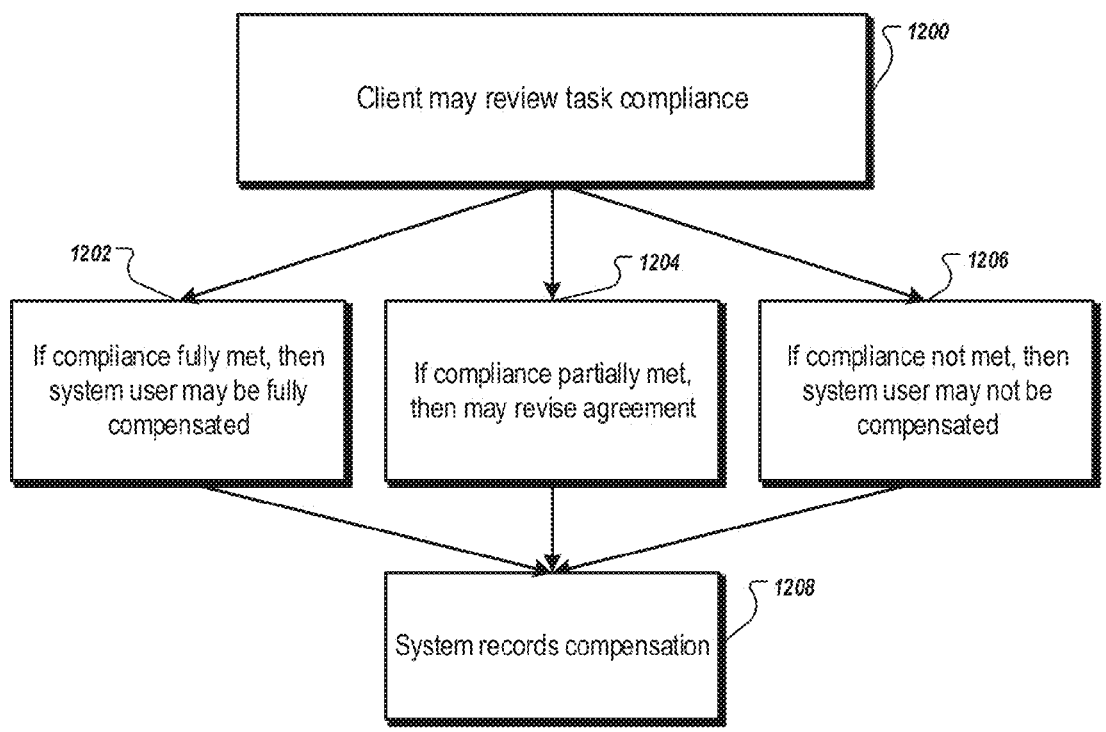
FIG. 12 is a process flow chart of a subpart of the process of FIG. 10 illustrating compensation for tasks to system user(s).

The "System user(s) compensated for tasks" 1012 step is explained in greater detail with relation to FIG. 12 and the associated portions of this disclosure hereafter.

The "Partner(s) may invest" 1014 step typically may be performed by end users of the system 105. Typically, partners may be individuals who may not wish to complete tasks for the virtual entity, but still wish to invest for equity in the virtual entity. This typically may be done by the partner connecting to the system 105 frontend, selecting a virtual entity to invest in, sending money to the virtual entity directly or indirectly (e.g., inventor may send money to the system 105 to then pass to the virtual entity), and receiving equity in the virtual entity. In some implementations, as similarly described above, the equity compensated may be a direct conversion based on the estimated value of the virtual entity, while in other implementations the compensation may be using an alternative structure (e.g., a time-sensitive compensation structure, a remainder-sensitive compensation structure, etc.). In some implementations, also as above described, the system 105 may then record, track, and/or display equity allocation for the virtual entity.

The "System tracks domain valuation" 1016 step typically may be performed by the system 105. Typically, the system 105 employs multiple detection, measurement, and identification systems and methods, tabulates data obtained through those systems, then queries and analyzes stored data associated with the virtual entity to arrive at a value that the virtual entity website may sell for to a buyer. In some implementations, the data may be stored entirely on the system 105 (e.g., in a system database), while in other implementations the data may be collected, in whole or in part, from external sources. For example, the system 105 may query and collect data regarding, but not limited to, Internet traffic to the website, the website's position on search engines using certain search terms (e.g., general terms that may be associated with the virtual entity field), and reviews and rankings on the Internet of the virtual entity, etc. This data may then be used by the system 105 in a predefined formula to determine the expected value for a sale.

In other implementations, the system 105 may use multiple formula that may aggregate to an overall value and/or the system 105 and/or the client may define custom valuation formulas to use when calculating the valuation. For example, the client may wish to further define the formula to estimate the blog component and the social interaction components separately, taking into account specific ranking metrics from a social interaction-tracking firm that may not be presently implemented in the valuation computation formulas of the system 105.

In other implementations, the system 105 may outsource, in whole or in part, data collection, data storage, and/or valuation estimates used by the system 105 to external sources. For example, a third-party entity may collect all or part of the data necessary for calculation of the valuation by the system 105, and the system 105 may then retrieve the data from that third-party entity to make valuation estimates to clients. In other implementations, the valuation estimate may be outsourced to another third-party entity to perform all or part of the valuation process, and then the system 105 may retrieve the estimate and provide the valuation to the client.

Figure 13:
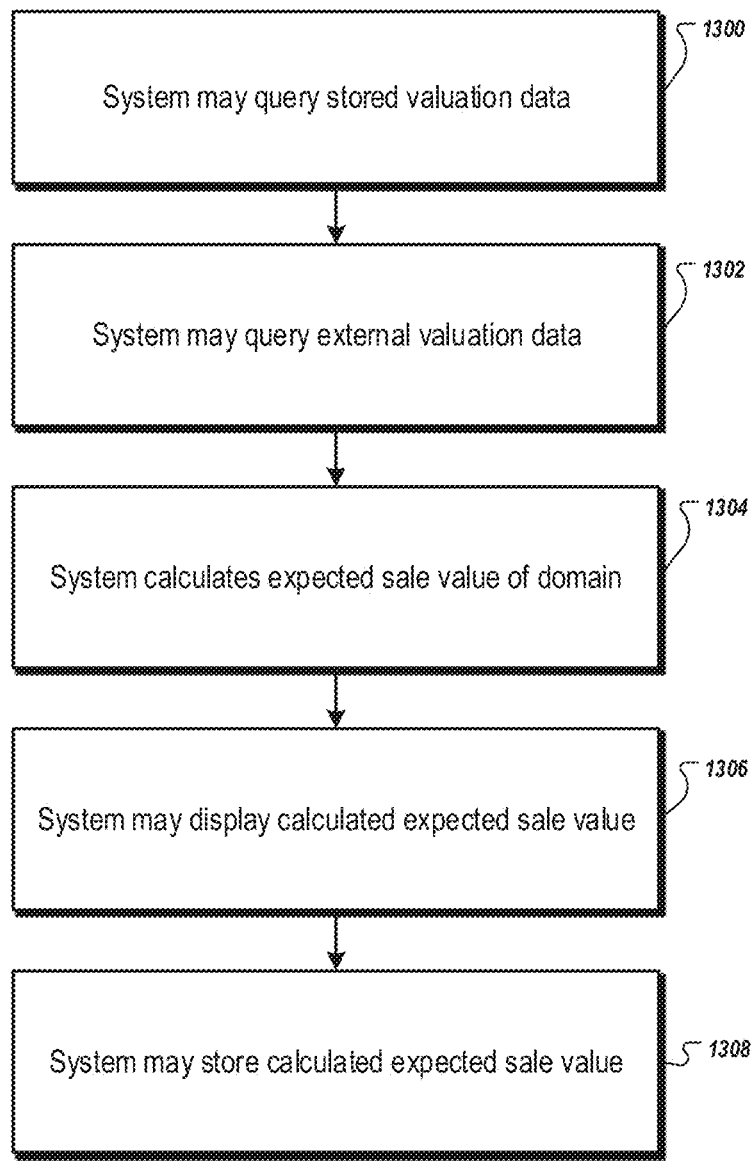
FIG. 13 is a process flow chart of a subpart of the process of FIG. 10 illustrating tracking of domain valuation by the system.

The "System tracks domain valuation" 1016 step is explained in greater detail with relation to FIG. 13 and the associated portions of this disclosure hereafter.

The "If valuation reaches conversion threshold, system converts virtual entity to legal entity" 1018 step typically may be performed by the system 105 and/or the client. Typically, a conversion threshold may be established by the system 105 and/or the client, and the conversion threshold may be a dynamic value or a static value. For example, the client may wish to convert the virtual entity that has been built around the website into a legal entity once the system 105 estimates the valuation of the virtual entity at $100,000.

In some implementations, conversion of the virtual entity to the legal entity may occur automatically by the system 105. For example, after reaching the conversion threshold the system 105 may prepare articles of incorporation and/or any other document necessary for creation of the legal entity and file these conversion documents with the proper authorities (e.g., a secretary of state office). In other implementations, the conversion process may be user initiated or semi-automated by the system 105. For example, the system 105 may simply notify the client that a conversion threshold has been reached, or the system 105 may prepare conversion documents for the legal entity and deliver those conversion documents to the client, but require the client to check and file the conversion documents with the proper authorities.

In some implementations, the conversion threshold need not be constrained to a monetary value. For example, the conversion threshold may be, but is not limited to, after the virtual entity has experienced a certain level of continuous user-base growth, a set level of investor activity, or a level and/or increasing number of clickthrough conversions. Thus, a virtual entity may wish to convert to at a point in its existence that may be entirely unconnected to the valuation of the virtual entity at a point in time.

Figure 14:
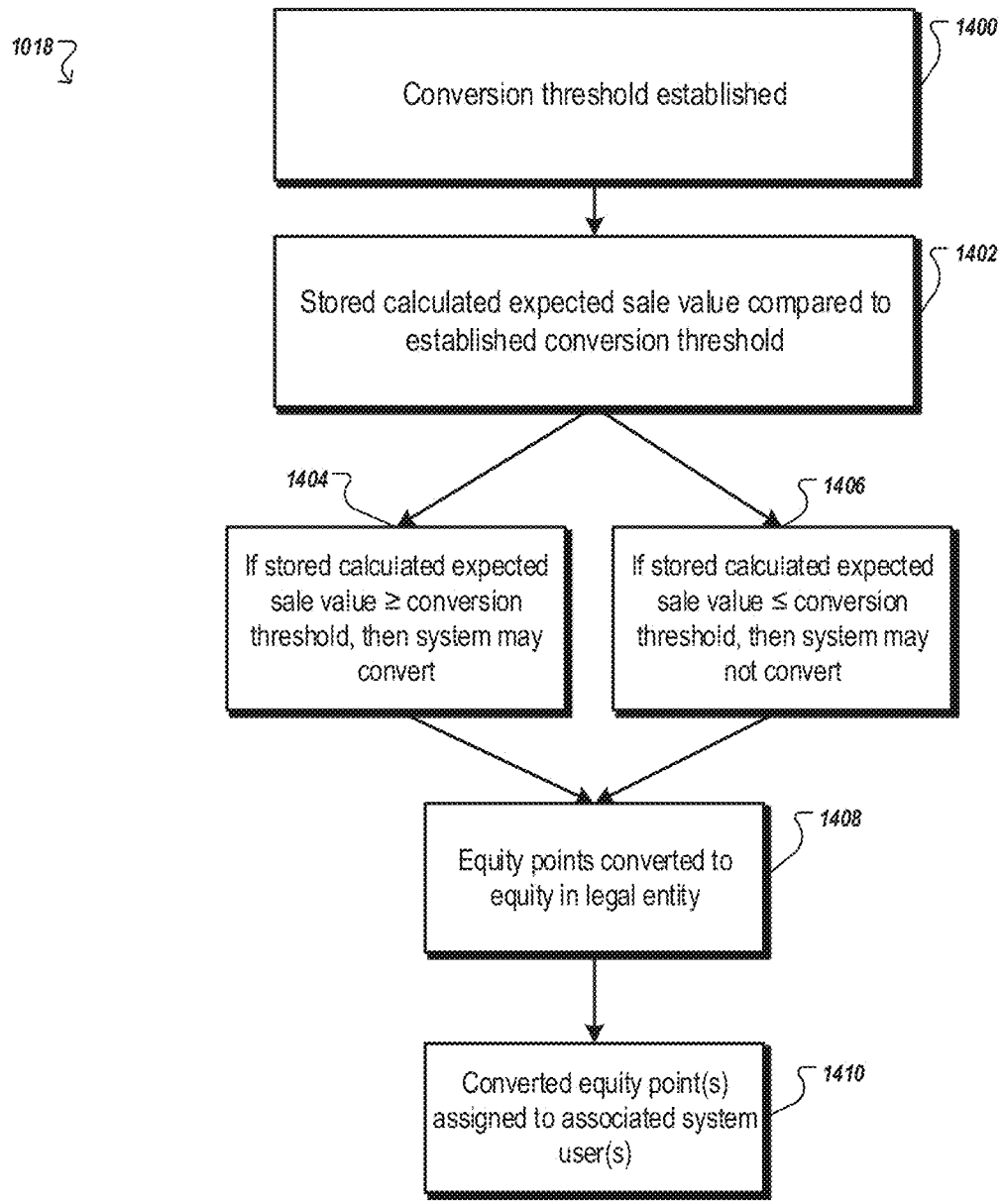
FIG. 14 is a process flow chart of a subpart of the process of FIG. 10 illustrating conversion of a virtual entity to a legal entity where valuation reaches a conversion threshold.

The "If valuation reaches conversion threshold, system converts virtual entity to legal entity" 1018 step is explained in greater detail with relation to FIG. 14 and the associated portions of this disclosure hereafter.

FIG. 11 describes the subparts of the "System automates website start-up" 1006 step, typically including the substeps of "System checks registration" 1100; "System may purchase registration" 1102; "Client may select template" 1104; "System wraps feature-set(s) into template" 1106; "System initializes and makes accessible website" 1108; and "System associates website with client" 1110. In some instances, these steps may be repeated several times in sequential order, steps may be cyclically performed to reach a threshold, and/or one or more steps may be omitted.

The "System checks registration" 1100 step typically may be performed by the system 105. Typically, the system 105 may check the present registration of the website (e.g., through a domain registration service) and then, if necessary, purchase the website registration.

In some implementations, the system 105 may suggest alternate website names after the client's input of the website. For example, if the domain is already registered, the system 105 may generate and suggest domain names that are similar to the previously input domain name (e.g., CampusAthletics.com may be taken but CollegeAthletics.com and/or CampusAthletics.org may be open for registration). In other implementations, the system 105 may also suggest similar domain names that the client may want to also purchase for registration. For example, after inputting CompanyA.com, the system 105 may also suggest CompanyA.org, CompanyA.net, etc. for registration by the client. This may, for example, be useful to avoid 'typosquatters' who purchase similarly named or common misspellings of domains to generate revenue from individuals that unwittingly browse to the typosquatter's websites.

The "System may purchase registration" 1102 step typically may be performed by the system 105. For example, after the system 105 checks the input website name and determines that the website name is available for purchase, the system 105 may facilitate the purchase of the website domain. In some implementations, the purchasing mechanism may be automatic (e.g., where a client has set the system 105 to automatically purchase an available domain upon input using a stored payment option on the system 105) or user authorized (e.g., where the client is prompted with a message like "This domain is available for registration. Would you like to purchase [domain name] for [price]?")

In additional implementations, the system 105 may prompt the client for payment information. For example, the system 105 may prompt the user "[Domain name] is available! If you would like to purchase [domain name], enter your credit card information below" and then generate a form for the client to input his or her credit card information.

The "Client may select template" 1104 step typically may be performed by the client. The client typically may select a template for the system 105 from a listing of system-provided, client-provided, and/or end user-provided templates and/or schemas. In some implementations, the template may be displayed as a small-scale preview and/or a full-scale preview of what the completed website may look like. The preview may be generated in the same window and/or a new window that the client may browse. In some implementations, the client may be able to make modifications to the preview (e.g., dragging and dropping icons and text, changing fonts, etc.) and have the client's modifications reflected in the final website design and/or in the creation of a new template saved on the system 105.

The "System wraps feature-set(s) into template" 1106 step typically may be performed by the system 105. Typically, the system 105 adds additional features and functionality into the chosen template to enable further customization, personalization, and/or tracking of data for valuation. For example, the system 105 may automatically customize all icons and hyperlinks for social media references to link to a client's social media profiles. In other implementations, the system 105 may add scripts, modules, extensions, and/or other mechanisms to facilitate and/or enhance valuation data collection. For example, the website may, but is not limited to, track visitors to the website, end user viewing habits, end user activity on the website, end user clickthrough conversion rates, social media interaction and/or trending, etc.

The "System initializes and makes accessible website" 1108 step typically may be performed by the system 105. Typically, the system 105 may configure and/or enable the website for public read, write, and/or execute (depending on the circumstances) in a Web server application (e.g., APACHE HTTP SERVER (APACHE HTTP SERVER is a claimed trademark of The Apache Software Foundation, a Delaware corporation, located at 1901 Munsey Ave., Forest Hill, Md. 21050), NGINX (NGINX is a registered trademark of Nginx Software, Inc., a Delaware corporation, located at 600 Montgomery St., 43 floor, c/o BV Cap, San Francisco, Calif. 94111), etc.). For example, the system 105 may receive the website name and modify the NGINX configuration file(s) to reflect the availability of the website. Thus, an end user and/or the client may, for example, browse to the website through an Internet browser and view the template-created website portal for the virtual entity.

In other implementations, the system 105 may connect to and/or instruct one or more other servers having one or more Web server applications to create and/or modify the Web server applications to initialize and make accessible the website name entered on the system 105. For example, after the client enters the desired website name (and the system 105 purchases the website name if necessary), the system 105 may then connect to a dedicated and/or other server(s) apart from the system 105 servers and modify and/or instruct the non-system 105 server to initialize and/or make available the input website through the web server application.

The "System associates website with client" 1110 step typically may be performed by the system 105. Typically, after the system 105 has received the input website name from the client, purchased the website name if necessary, and initialized and/or make accessible the website portal, the system 105 may then associate the website with the client. For example, if the input website name has gone through the website portal setup process, the system 105 may then save the website name in a database and associate that database entry with the client who input the website name.

In other implementations, the system 105 may add the input website name into a database during, before, or after any of the above-listed steps. For example, the system 105 may, but is not limited to, add the input website name after the client first inputs the website name, during or after the purchasing of the website name step, etc. In some other implementations, the system 105 may associate the website with the client in the database during, before, or after any of the above-listed steps in a similar fashion as outlined above.

FIG. 12 describes the subparts of the "System user(s) compensated for tasks" 1012 step, typically including the substeps of "Client may review task compliance" 1200; "If compliance fully met, then system user may be fully compensated" 1202; "If compliance partially met, then may revise agreement" 1204; "If compliance not met, then system user may not be compensated" 1206; and "System records compensation" 1208. In some instances, these steps may be repeated several times in sequential order, steps may be cyclically performed to reach a threshold, and/or one or more steps may be omitted.

The "Client may review task compliance" 1200 step typically may be performed by the client. Typically, a user who is performing a task for a client may be bound to complete the task according to a certain specification. For example, the client may create a task to write a client's mission statement to be displayed on a virtual entity website of the client, and the task specifies that the mission statement must be greater than 200 words but less than 400 words in length. When the user agrees to perform the task, he or she may be bound to the specifications of the task. In some implementations, the user and/or the client may further negotiate the specification of the task before performing the task. For example, the user may negotiate with the client to raise and/or lower the floor and ceiling word count values for the mission statement.

In other implementations, compensation to the user may be determined based upon the user's full, partial, and/or nonexistent completion of a task. Specific instances of such full, partial, and/or nonexistent completion of a task are hereafter described.

The "If compliance fully met, then system user may be fully compensated" 1202 step typically may be performed by the system 105 and/or a client. Typically, the client may review the user's completion of the task and compare the user's work to the expected task specifications. Where the client believes that the work done by the user meets and/or exceeds the expected work based on the task specifications, then task compliance may be deemed fully met and the system user who performed the work may be fully compensated. In some implementations, as described elsewhere in this disclosure, compensation may be in currency, in equity, or in any other medium acceptable to both the user performing the work and the client paying that user.

In other implementations, where the client deems that the user completing the task exceeded the task specifications, the client may provide additional compensation to that user. For example, if a user accepted a task to design a logo for the virtual entity website for $200 and did so successfully, and the user also designed another logo for a virtual entity product, the client may decide to provide an additional $100 for the user's work.

The "If compliance partially met, then may revise agreement" 1204 step typically may be performed by the client and/or the end user. As above, the client may review the user's completion of the task and compare the user's work to the expected task specifications. Where the client believes that the work done by the user partially meets the expected work based on the task specifications, then task compliance may be deemed partially met and the client and/or performing user may agree to revise the agreement. For example, the client may, but is not limited to, agree to revise the agreement to give the user additional time to complete the task, modify the task specifications, or any other revisions. Additionally, the performing user may, but is not limited to, agree to perform further services to account for the partial completion or to fix issues that may be preventing the work from being considered fully complete.

In other implementations, the system user who performed the work may be partially and/or not compensated. For example, where a user accepts a task to design three product logos for the virtual entity, but only creates two, then the client may compensate the user with partial compensation. The performing user may agree to receive lesser compensation for the task as in full accord and satisfaction of the partial performance. For example, the user and the client may agree that the user's performance was worth 50% of the compensation amount, and the client may provide that 50% of the originally agreed compensation to the performing user.

In some implementations, this partial compensation may be based upon the amount of work completed according to the specification (e.g., completed two out of three may equate to 66.66% compensation), weighted based on the importance of the task specifications (e.g., the one out of three logos left unfinished was the most important logo and accounts for 50% of the task specification), or using any other mechanism and/or formula to break down partial completion of the task.

In some other implementations, partial completion of the task may result in zero (or nominal) compensation to the user performing the task work. For example, if the user performed only a subpart of the task or did not complete the primary objective of the task specification, then the client may elect to provide zero or nominal compensation to that user. Thus, if a user accepted a task and agreed to create three logos for the virtual entity, but only completed choosing a color scheme for the logos, this partial completion may entitle the performing user to zero compensation from the client. In some instances, the client may provide a nominal and/or token compensation to the user for the work performed on the task. For example, if the user only selected the color scheme for the logos in the above scenario, but failed to complete the task due to personal hardship(s), the client may still pay the user a small percentage of the task completion amount. In some implementations, where successful completion of a task is factored into a system user's recommendation and/or matching to tasks, such nominal and/or token compensation may negate or mitigate a negative impact upon the recommendation and/or matching process and/or formula.

In some further implementations, as described elsewhere in this disclosure, compensation may be in currency, in equity, or in any other medium acceptable to both the user performing the work and the client paying that user.

The "If compliance not met, then system user may not be compensated" 1206 step typically may be performed by the system 105 and/or the client. As above, the client may review the user's completion of the task and compare the user's work to the expected task specifications. Where the client believes that the work done by the user entirely fails to meet the expected work based on the task specifications, then task compliance may be deemed unmet and the performing user may not be compensated for work done on the task. For example, if the performing user agreed to the task but never actually began work on the task, then performance may not be said to have begun and compensation to the performing user may be denied.

In other implementations, where the performing user provided the client with work that is outside of the scheme of the task specifications (e.g., designed a logo for the virtual entity instead of writing a mission statement for the virtual entity), and the client may not derive value from the work performed (e.g., the logo is unsatisfactory and/or the virtual entity already has a logo), then the client again may deny compensation to the performing user.

In some further implementations, where the performing user provided the client with work that is outside of the scheme of the task specifications (e.g., designed a logo for the virtual entity instead of writing a mission statement for the virtual entity), but the client may derive value from the work performed (e.g., the logo is satisfactory and the virtual entity does not already have a logo), then the client again may elect to provide compensation to the performing user. As explained elsewhere in this disclosure, this may be useful to mitigate and/or negate negative effects for the user in a matching and/or recommendation process and/or formula.

The "System records compensation" 1208 step typically may be performed by the system 105. Typically, the system 105 may record compensation to a system 105 database (e.g., the system database 180) and/or a database accessible to the system 105. For example, the system 105 may store the compensation information on a network-attached storage (NAS) device connected on the same network switch as the system 105 servers, a remote NAS device, and/or on a database located entirely separate from the system 105 servers (e.g., a cloud database implementation). In some implementations, the system 105 may also associate the compensation with a client, a task, the performing user, and/or a date/time. For example, the system 105 may record that Client A compensated User B with 1% equity in the virtual entity for creating a Client A's virtual entity's mission statement on Sep. 14, 2014.

As described elsewhere in this disclosure, the recorded compensation data may be used to generate a listing and/or representation of the aggregate equity allocations for a virtual entity. Thus, the system 105 may query the database(s) where compensation and/or equity data may be stored, retrieve this data, and present equity allocation in a list, a pie chart, a histogram, a line graph, and/or any other mechanism of displaying a virtual entity's equity allocation.

FIG. 13 describes the subparts of the "System tracks domain valuation" 1016 step, typically including the substeps of "System may query stored valuation data" 1300; "System may query external valuation data" 1302; "System calculates expected sale value of domain" 1304; "System may display calculated expected sale value" 1306; and "System may store calculated expected sale value" 1308. In some instances, these steps may be repeated several times in sequential order, steps may be cyclically performed to reach a threshold, and/or one or more steps may be omitted.

The "System may query stored valuation data" 1300 and the "System may query external valuation data" 1302 steps typically may be performed by the system 105. Typically, the system 105 may locate and/or query data associated with a client and or client's virtual entity in order to provide data for the "System calculates expected sale value of domain" 1304 step. Stored data for use in valuation may include, but is not limited to, expert valuations, layperson valuations, Internet traffic to the website, the website's position on search engines using certain search terms (e.g., general terms that may be associated with the virtual entity field), reviews, and rankings on the Internet of the virtual entity, etc. The system 105 may typically query external sources for valuation data as well to receive and store external valuation data. External valuation data may be as described above for stored data, but may typically originate from outside the system 105 (e.g., an external and/or third-party source).

The "System calculates expected sale value of domain" 1304 step typically may be performed by the system 105. Typically, once the system 105 queries and retrieves stored valuation data, the system 105 may then calculate a domain's expected value. For example, the system 105 may first determine how long the current domain registration may last and multiply by the current cost to purchase a new domain name to arrive at a floor value. From this floor, the system 105 may then factor in, but is not limited to, Internet traffic reporting figures (e.g., from ALEXA (ALEXA is a registered trademark of Alexa Internet Corp., a California corporation, located at Presidio of San Francisco, Building 37, San Francisco, Calif. 94129), DOUBLECLICK (DOUBLECLICK is a registered trademark of the Google, Inc., a Delaware corporation, located at 1600 Amphitheatre Parkway, Mountain View, Calif. 94043), QUANTCAST (QUANTCAST is a registered trademark of the Quantcast Corporation, a Delaware corporation, located at 201 Third Street, San Francisco, Calif. 94103), unique end user devices logged, frequency of repeat visitors, frequency of visitor interaction with the system 105, amount of revenue generated, clickthrough conversion rates, etc.

In some implementations, the system 105 may utilize multiple different formulas and/or processes to arrive at an aggregate valuation figure, whereas in other implementations the system 105 may use a single process and/or formula to arrive at the valuation figure.

In other implementations, the system 105 may offload and/or outsource, in whole or in part, the valuation calculation. For example, the system 105 may simply retrieve a valuation figure prepared by a third-party entity using the third party's own valuation formula and/or process; a client-provided valuation formula and/or process; and/or a system-provided valuation formula and/or process. This may, for example, be performed due to computational requirements, economic advantages, physical restrictions, and/or any other reason to offload the valuation component of the system 105. The system 105 may also outsource and retrieve only part(s) of the valuation formula and/or process, then integrating the retrieved part(s) into an aggregate valuation formula and/or process. For example, the system 105 may outsource an international Internet traffic and international market saturation valuation component, retaining all other components, and then integrating the international component with the domestic component.

The "System may display calculated expected sale value" 1306 step typically may be performed by the system 105. Typically, after calculating the expected sale value for the website/virtual entity, the system 105 may then generate and display the expected sale value to the client. Generation and/or display to the client may be solely of the expected sale value, while in other implementations the expected sale value may be broken down into subparts showing how the expected sale value may be calculated to arrive at the expected sale price. For example, an expected sale valuation of $10,000 may simply be displayed to the client, while in other cases the $10,000 may be broken down into explanatory subparts (e.g., $2000 for reviews and reputation, $2000 for website visitors, $2000 for tasks completed by users, and $4000 for sales of virtual entity's products).

In some implementations, the system 105 may be configured to deliver to and/or notify the client of valuation figures. For example, the system 105 may calculate a weekly valuation figure and display/store the weekly-calculated valuation figure in the system 105 so that the client may view the weekly-calculated valuation figure by logging into the system 105. In some other implementations, the system 105 may directly or indirectly send a valuation figure to the client. For example, the system 105 may email the client at a contact email address, contact the client's telephone via an automated phone messaging system, and/or mail a physical report to the client's mailing address.

The "System may store calculated expected sale value" 1308 step typically may be performed by the system 105. Typically, after the system 105 calculates the expected sale value of the client's website/virtual entity, the system 105 may then store the calculated expected sale value. For example, the system 105 may store the calculated expected sale value in a system 105 database (e.g., the system database 180), a remotely located database, a third-party database, and/or any other storage mechanism). In some implementations, the client and/or end user(s) may view the stored calculated expected sale value(s) associated with a client website/virtual entity. In some other implementations, the system 105 and/or client may perform analytics on the stored calculated expected sale value(s) to predict trends with the stored data. For example, the system 105 may predict, based on the stored calculated expected sale values associated with a client website/virtual entity that the client website/virtual entity may increase in value 30% over the next year and/or reach a conversion threshold in 11 months.

FIG. 14 describes the subparts of the "If valuation reaches conversion threshold, system converts virtual entity to legal entity" 1018 step, typically including the substeps of "Conversion threshold established" 1400; "Stored calculated expected sale value compared to established conversion threshold" 1402; "If stored calculated expected sale value conversion threshold, then system may convert" 1404; "If stored calculated expected sale value conversion threshold, then system may not convert" 1406; "Equity points converted to equity in legal entity" 1408, and "Converted equity point(s) assigned to associated system user(s)" 1410. In some instances, these steps may be repeated several times in sequential order, steps may be cyclically performed to reach a threshold, and/or one or more steps may be omitted.

The "Conversion threshold established" 1400 step typically may be performed by the system 105 and/or the client. Typically, the conversion threshold may be a dynamic value or a static value. For example, the client may wish to convert the virtual entity that has been built around the website into a legal entity once the system 105 estimates the valuation of the virtual entity at $100,000.

In some implementations, the conversion threshold may be set at the time when the client creates the website/virtual entity, while at other times the conversion threshold may be set before or after the creation of the client's website/virtual entity. For example, the system 105 may have a system-wide default (e.g., $100,000), the client may have a conversion threshold that is used on all of the client's created websites, and/or the client and/or the system 105 may set the conversion threshold at a point in time after the creation of the website/virtual entity. That time afterward may be shortly after the website/virtual entity's creation (e.g., in a prompt immediately following the website initialization), months, or years after the creation. In other implementations, the conversion threshold for a website/virtual entity may be set only one time, whereas in other implementations the conversion threshold may be set an infinite number of times.

In other implementations, the conversion threshold need not be constrained to a monetary value. For example, the conversion threshold may be, but is not limited to, after the virtual entity has experienced a certain level of continuous user-base growth, a set level of investor activity, or a level and/or increasing number of clickthrough conversions. Thus, a virtual entity may wish to convert to at a point in its existence that may be entirely unconnected to the valuation of the virtual entity at a point in time.

In other implementations, there may be more than one conversion threshold for a client website/virtual entity. For example, a website/virtual entity may have multiple associated conversion thresholds that must be met either in whole or in part. For example, there may be three conversion thresholds: 1 year, $100,000 value, and/or 100,000 end user accounts. In some implementations, completion of any one of the conversion thresholds (e.g., 1 year, $100,000 value, or 100,000 end user accounts) may trigger conversion. In another implementation, conversion may require completion of every conversion threshold (e.g., 1 year, $100,000 value, and 100,000 end user accounts). Further, in another implementation, completion of a subset of the conversion thresholds (e.g., 1 year and $100,000 value, 1 year and 100,000 end user accounts, $100,000 value and 100,000 end users, etc.) may trigger conversion.

The "Stored calculated expected sale value compared to established conversion threshold" 1402 step typically may be performed by the system 105. Typically, the system 105 may store the calculated expected sale value compared to the established conversion threshold either as a value (e.g., a ratio comparing the two figures, a value indicating the division of the two figures (e.g., $100,000/$200,000=0.5), or any other mechanism for storing the figures. The system 105 typically may store the figures and/or representation of the figure comparison in a system 105 database (e.g., the system database 180) or another database connected to the system (directly or over a network). In some implementations, the system 105 may only temporarily store the comparison of the two figures in order to do a comparison function. For example, the system 105 may divide the stored calculated expected sale value by the established conversion threshold, and if the numeric result (e.g., 0.5 as described above) meets conversion requirements (e.g., convert where result ≥1.0), then the comparison function is fulfilled and/or truncated.

The "If stored calculated expected sale value conversion threshold, then system may convert" 1404 and the "If stored calculated expected sale value conversion threshold, then system may not convert" 1406 steps typically may be performed by the system 105 and/or the client. Typically, the system 105 compares the stored calculated expected sale value (e.g., as calculated in the "System calculates expected sale value of domain" 1304 step) to the conversion threshold(s) (e.g., as set in the "Conversion threshold established" 1400 step).

As explained above, in some implementations, this step may be already fulfilled and/or truncated. For example, if the precomputed result is greater than or equal to a certain threshold (e.g., 1.0), then the system 105 may convert. In other implementations, where the comparison may not lend itself to easy division with a finite value, the system 105 may compare multiple comparison operations to determine if the stored calculated expected sale value is greater than or equal to the conversion threshold. For example, if the client website/virtual entity employs three conversion thresholds that must all be met, the system 105 may compare each threshold individually if the system 105 may not perform the comparison in one step.

In some implementations, conversion of the virtual entity to the legal entity may occur automatically by the system 105. For example, after reaching the conversion threshold the system 105 may prepare articles of incorporation and/or any other document necessary for creation of the legal entity and file these conversion documents with the proper authorities (e.g., a secretary of state office). In other implementations, the conversion process may be user initiated or semi-automated by the system 105. For example, the system 105 may simply notify the client that a conversion threshold has been reached, or the system 105 may prepare conversion documents for the legal entity and deliver those conversion documents to the client, but require the client to check and file the conversion documents with the proper authorities.

The legal entity may be, but is not limited to, a corporation, a limited company (e.g., a limited liability company), an unlimited company, a limited liability partnership, a limited partnership, a not-for-profit corporation, a company limited by guarantee, a partnership, and/or a sole partnership. In some implementations, the client and/or the system 105 may select the type of legal entity that the virtual entity may be converted to. This may be, for example, because of country or state limitations on entities, economic circumstances, citizenship of equity holders, etc. In some implementations, the system 105 may select the optimal type of legal entity for the client, whereas in other implementations the client may select the type of legal entity by himself or herself. In still other implementations, the client may select an account-wide preference so that all websites/virtual entities convert to a certain legal entity type (e.g., an LLC).

The "Equity points converted to equity in legal entity" 1408 step typically may be performed by the system 105 and/or the client. Typically, the system 105 may query data associated with the client website/virtual entity (e.g., on the system database 180) and retrieve data associated the aggregate equity in a client's virtual entity. For example, the system 105 may return that the client's entity has 200 users, an aggregate of 1000 units of equity (e.g., 1000 equity point) in the virtual entity, and a total equity percentage equal to 25% of the virtual entity. Thus, the system 105 may create 4000 total units of equity (1000 units/25%=4000 total units) in the real world, legal entity. In other implementations, the system 105 may perform these calculations to determine appropriate equity figures to the client, who may then file the proper conversion documents defining equity in the real world, legal entity.

In some implementations, the amount of equity points in the virtual entity may not be directly converted to equity (e.g., shares) in the real world, legal entity. For example, the client may provide twice the equity to partners or early investors. Thus, a partner may have only contributed currency equivalent to 1% equity in the virtual entity (equivalent to perhaps ten equity points), but upon conversion the partner may receive twenty units of equity in the real world, legal entity.

The "Converted equity point(s) assigned to associated system user(s)" 1410 step typically may be performed by the system 105 and/or the client. Typically, the system 105 may query data associated with the client website/virtual entity (e.g., on the system database 180) and retrieve data associated with users holding equity in the virtual entity and allocation of the virtual entity's equity to these users. For example, the virtual entity may have only two equity holding users (e.g., the client and an investing partner) or the virtual entity may have hundreds or thousands of equity holding users that contributed to various tasks. The system 105 may then distribute shares and/or real equity in the legal entity to the equity holding users proportionately according to the equity held by each user compared to the virtual entity's equity as a whole.

In other implementations, equity in the legal entity may be distributed according to a disproportionate and/or altered distribution scheme. For example, a client may incentivize early investment in the client's virtual entity by giving the first one hundred contributing users shares with voting rights in a potential legal entity (if the conversion threshold was ever reached). Other clients may incentivize partnerships by giving all partners preferred shares, which may pay out dividends before common stocks in the legal entity.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system 105 components in the embodiments described above should not be understood as requiring such separation in all embodiments, and it should be understood that the described program components and systems may typically be integrated together in a single hardware and/or software product or packaged into multiple hardware and/or software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

I claim:

1. A system for providing a virtual entity and equity system over a computer network configured to operate over a network using a server, a client, and a plurality of end-users, comprising:
   a server operating the virtual entity and equity system, the server adapted to communicate with a network;
   wherein the server is configured to:
      receive an input website from the client, wherein the input website is a uniform resource locator (URL);
      create a unique website portal around the input website for the virtual entity, wherein the virtual entity is defined by the input website;
      associate the input website and the virtual entity with the client;
      observe input website activity, wherein equity value is determined based on end-user contribution to the virtual entity;
      derive valuation data for the input website;
      store the valuation data for the input website;
      compute valuation of the virtual entity from the valuation data to provide a calculated expected sale value;
      receive and store a conversion threshold from the client;
      compare the calculated expected sale value to the conversion threshold;
      create a legal entity corresponding to the virtual entity if the calculated expected sale value is greater than the conversion threshold; and
      provide an integrated application suite, wherein the integrated application suite comprises an referral management system, a capitalization table management system, a social media identifier system, a traffic system, and an end-user interaction metric system.

2. The system of claim 1, wherein the create step is automatically performed with no client interaction.

3. The system of claim 1, wherein the server is further configured to:
   provide conversion documents to the client.

4. The system of claim 1, wherein the server is further configured to:
   receive external valuation data from an external source.

5. The system of claim 4, wherein:
   the client comprises a plurality of clients;
   the input website comprises a plurality of input websites;
   the website portal comprises a plurality of website portals;
   the virtual entity comprises a plurality of virtual entities; and
   the external source comprises a plurality of external sources.

6. The system of claim 1, wherein the server is further configured to:

integrate game-like components into the virtual entity and equity system; and wherein the website portal interacts with end users such that the end users provide services to the website portal, and wherein the website portal evaluates input website activity and displays the evaluated input website activity of end users in a game-like manner.

7. The system of claim 1, wherein the server is further configured to:
display the calculated expected sale value to the client.

8. The system of claim 1, wherein during the observe input website activity step, the end-user contribution is selected from the group consisting of virtual entity content development, virtual entity database building, virtual entity content promotion, supervising virtual entity development, creating secondary domains based on the input website, creating secondary services based on the input website, and combinations thereof.

9. A virtual entity and equity system operating over a computer network using a server, a client, and end-users, comprising:
a server operating the virtual entity and equity system, the server configured to communicate with a network;
wherein the server is configured to:
receive a URL-formatted website address from the client;
construct an administrative portal around the website address for a virtual entity based substantially on the website's address;
associate the website address and the virtual entity with the client in a system database;
observe website address activity;
determine an equity value for each end-user based on each end-user's contribution to the virtual entity;
derive valuation data for the virtual entity;
store the valuation data for the virtual entity;
compute a valuation of the virtual entity from the valuation data to provide a calculated expected sale value;
receive and store a conversion threshold from the client;
compare the calculated expected sale value to the conversion threshold;
create a real-world legal entity corresponding to the virtual entity if the calculated expected sale value is greater than the conversion threshold; and
provide an integrated application suite, wherein the integrated application suite comprises an referral management system, a capitalization table management system, a social media identifier system, a traffic system, and an end-user interaction metric system.

10. The system of claim 9, wherein the create step is automatically performed with no client interaction.

11. The system of claim 9, wherein the server is further configured to:
provide conversion documents to the client.

12. The system of claim 9, wherein the server is further configured to:
receive external valuation data from an external source.

13. The system of claim 9, wherein:
the client comprises a plurality of clients;
the website address comprises a plurality of website addresses;
the administrative portal comprises a plurality of administrative portals; and the virtual entity comprises a plurality of virtual entities.

14. The system of claim 9, wherein the server is further configured to:
integrate game-like components into the virtual entity and equity system; and wherein the administrative portal interacts with the end users such that the end users provide services to the virtual entity, and wherein the administrative portal evaluates website address activity and displays the evaluated website address activity of the end users in a game-like manner.

15. The system of claim 9, wherein the server is further configured to:
display the calculated expected sale value to the client.

16. The system of claim 9, wherein during the observe website address activity step, the end-user contribution is selected from the group consisting of virtual entity content development, virtual entity database building, virtual entity content promotion, supervising virtual entity development, creating secondary domains based on the website address, creating secondary services based on the website address, and combinations thereof.

* * * * *